United States Patent
Mimura et al.

(10) Patent No.: US 11,016,497 B2
(45) Date of Patent: May 25, 2021

(54) VEHICLE CONTROL SYSTEM, VEHICLE CONTROL METHOD, AND VEHICLE CONTROL PROGRAM

(71) Applicant: HONDA MOTOR CO., LTD., Tokyo (JP)

(72) Inventors: Yoshitaka Mimura, Wako (JP); Naotaka Kumakiri, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 73 days.

(21) Appl. No.: 16/088,504

(22) PCT Filed: Mar. 28, 2016

(86) PCT No.: PCT/JP2016/059919
§ 371 (c)(1),
(2) Date: Sep. 26, 2018

(87) PCT Pub. No.: WO2017/168517
PCT Pub. Date: Oct. 5, 2017

(65) Prior Publication Data
US 2019/0113930 A1   Apr. 18, 2019

(51) Int. Cl.
*B60W 50/14* (2020.01)
*G05D 1/02* (2020.01)
(Continued)

(52) U.S. Cl.
CPC .......... *G05D 1/0223* (2013.01); *B60K 35/00* (2013.01); *B60W 30/10* (2013.01); *B60W 30/12* (2013.01);
(Continued)

(58) Field of Classification Search
CPC ........ G05D 1/0223; G05D 2201/0213; B60W 30/10; B60W 30/12; B60W 50/14;
(Continued)

(56) References Cited

U.S. PATENT DOCUMENTS

2003/0045990 A1   3/2003  Adachi
2011/0190972 A1*  8/2011  Timmons ............... G08G 1/166
                                                      701/31.4
(Continued)

FOREIGN PATENT DOCUMENTS

CN   104903173    9/2015
JP   2002-089314  3/2002
(Continued)

OTHER PUBLICATIONS

English Translation WO2016157717A1 (Year: 2016).*
(Continued)

*Primary Examiner* — Peter D Nolan
*Assistant Examiner* — Ashley L Redhead, Jr.
(74) *Attorney, Agent, or Firm* — Amin, Turocy & Watson, LLP

(57) ABSTRACT

According to an embodiment, a vehicle control system includes: a determination unit determining a schedule of a running locus and speed control of a subject vehicle; a running control unit automatically performing at least speed control of the subject vehicle on the basis of the schedule determined by the determination unit; and an interface control unit causing a display unit to display information representing a position or a section at which the subject vehicle accelerates or decelerates in the speed control in association with information representing the running locus on the basis of the schedule determined by the determination unit.

12 Claims, 15 Drawing Sheets

(51) Int. Cl.
    *B60W 50/10*    (2012.01)
    *B60K 35/00*    (2006.01)
    *B60W 30/10*    (2006.01)
    *B60W 30/12*    (2020.01)

(52) U.S. Cl.
    CPC ............ *B60W 50/10* (2013.01); *B60W 50/14* (2013.01); *B60K 2370/152* (2019.05); *B60K 2370/167* (2019.05); *B60K 2370/175* (2019.05); *B60K 2370/193* (2019.05); *B60K 2370/334* (2019.05); *B60K 2370/52* (2019.05); *B60W 2050/146* (2013.01); *B60W 2540/10* (2013.01); *B60W 2540/12* (2013.01); *B60W 2540/215* (2020.02); *B60W 2720/106* (2013.01); *G05D 2201/0213* (2013.01)

(58) Field of Classification Search
    CPC ........... B60W 50/10; B60W 2540/215; B60W 2720/106; B60W 2540/12; B60W 2540/10; B60W 2050/146; B60W 10/18; B60W 10/20; B60K 35/00; B60K 2370/175; B60K 2370/193; B60K 2370/152; B60K 2370/167; B60K 2370/334; B60K 2370/52
    See application file for complete search history.

(56) References Cited

U.S. PATENT DOCUMENTS

| | | | |
|---|---|---|---|
| 2012/0022716 A1 | 1/2012 | Kitahama et al. | |
| 2016/0207399 A1* | 7/2016 | Ogasawara | G06F 3/0412 |
| 2016/0207537 A1* | 7/2016 | Urano | B60W 50/16 |
| 2016/0335892 A1* | 11/2016 | Okada | G08G 1/123 |

FOREIGN PATENT DOCUMENTS

| | | | |
|---|---|---|---|
| JP | 2003-063272 | 3/2003 | |
| JP | 2006-031618 | 2/2006 | |
| JP | 2009-078735 | 4/2009 | |
| JP | 2010-198578 | 9/2010 | |
| JP | 2015-011458 | 1/2015 | |
| JP | 2015-087268 | 5/2015 | |
| JP | 2016-007955 | 1/2016 | |
| WO | 2015/045326 | 4/2015 | |
| WO | WO-2016157717 A1 * | 10/2016 | B62D 15/02 |

OTHER PUBLICATIONS

International Search Report and Written Opinion for International Patent Application No. PCT/JP2016/059919 dated Jun. 14, 2016, 10 pages.
Chinese Office Action for Chinese Patent Application No. 201680084023.2 dated Nov. 3, 2020.

* cited by examiner

188

| DRIVING MODE<br>NON-DRIVING<br>OPERATION SYSTEM | MANUAL<br>DRIVING<br>MODE | AUTOMATED DRIVING MODE | | | ... |
| --- | --- | --- | --- | --- | --- |
| | | MODE A | MODE B | MODE C | |
| NAVIGATION OPERATION | NO | YES | YES | NO | ... |
| CONTENT REPRODUCING OPERATION | NO | YES | NO | NO | ... |
| INSTRUMENT PANEL OPERATION | NO | YES | YES | YES | ... |
| ... | ... | ... | ... | ... | ... |

VEHICLE CONTROL SYSTEM, VEHICLE CONTROL METHOD, AND VEHICLE CONTROL PROGRAM

TECHNICAL FIELD

The present invention relates to a vehicle control system, a vehicle control method, and a vehicle control program.

BACKGROUND ART

In recent years, technologies for automatically performing at least one of speed control and steering control of a subject vehicle (hereinafter, referred to as automated driving) have been researched. In relation with this, a driving support device including a display unit that displays at least one of an acceleration and a deceleration of a vehicle generated for a target space and speed adjustment during speed control is known (for example, see Patent Literature 1).

CITATION LIST

Patent Literature

[Patent Literature 1] Japanese Unexamined Patent Application, First Publication No. 2009-078735

SUMMARY OF INVENTION

Technical Problem

However, in a conventional technology, there are cases in which a vehicle occupant is not able to intuitively acquire control details according to automated driving from display details.

The present invention is in consideration of such situations, and one object thereof is to provide a vehicle control system, a vehicle control method, and a vehicle control program capable of allowing a vehicle occupant to intuitively acquire control details according to automated driving.

Solution to Problem

An invention described in claim 1 is a vehicle control system (100) including: a determination unit (144, 146) determining a schedule of a running locus and speed control of a subject vehicle; a running control unit (160) automatically performing at least speed control of the subject vehicle on the basis of the schedule determined by the determination unit; and an interface control unit (170, 178) causing a display unit (50, 82) to display information representing a position or a section at which the subject vehicle accelerates or decelerates in the speed control in association with information representing the running locus on the basis of the schedule determined by the determination unit.

According to invention described in claim 2, in the vehicle control system according to claim 1, the interface control unit causes the display unit to display the position or the section at which the subject vehicle accelerates or decelerates in the speed control in a display form different from that of a background.

According to invention described in claim 3, in the vehicle control system according to claim 1, the interface control unit causes the display unit to display an image acquired by superimposing or integrating speed control information representing the position or the section at which the subject vehicle accelerates or decelerates in the speed control on or with an object corresponding to a running locus of the subject vehicle.

According to invention described in claim 4, in the vehicle control system according to claim 1, the display unit is a head-up display, and the interface control unit projects information representing one or both of the position or the section at which the subject vehicle accelerates or decelerates in the speed control and the running locus in association with an actual space visible through a front windshield that is a projection destination of the head-up display.

According to invention described in claim 5, in the vehicle control system according to claim 1, the interface control unit causes the display unit to output information representing that the position or the section at which the subject vehicle accelerates or decelerates in the speed control, which is output to the display unit, is changeable.

According to invention described in claim 6, the vehicle control system according to claim 1 further includes an operation accepting unit (50, 70, 176) that accepts an operation for changing the position or the section at which the subject vehicle accelerates or decelerates in the speed control that is made by an occupant of the subject vehicle, and the interface control unit changes the schedule on the basis of the operation accepted by the operation accepting unit.

According to invention described in claim 7, the vehicle control system according to claim 1 further includes an operation accepting unit that accepts an operation for changing the position or the section at which the subject vehicle accelerates or decelerates in the speed control that is made by an occupant of the subject vehicle, and the interface control unit causes the display unit to display information representing the position or the section at which the subject vehicle accelerates or decelerates in the speed control after the change of the schedule in association with information representing the running locus before the schedule is changed on the basis of the operation accepted by the operation accepting unit.

According to invention described in claim 8, in the vehicle control system according to claim 6 or 7, the operation accepting unit accepts the operation in accordance with the operation of an acceleration pedal (71) or a brake pedal (74) of the subject vehicle with the amount of operation that is less than a threshold for which control using the running control unit is released, and, in a case in which the operation is accepted by the operation accepting unit, the interface control unit changes the schedule such that the position or the section at which the subject vehicle accelerates or decelerates in the speed control advances.

An invention described in claim 9 is a vehicle control method using an in-vehicle computer including: determining a schedule of a running locus and speed control of a subject vehicle; automatically performing at least speed control of the subject vehicle on the basis of the determined schedule; and causing a display unit to display information representing a position or a section at which the subject vehicle accelerates or decelerates in the speed control in association with information representing the running locus on the basis of the determined schedule.

An invention described in claim 10 is a vehicle control program causing an in-vehicle computer to execute a process of: determining a schedule of a running locus and speed control of a subject vehicle; automatically performing at least speed control of the subject vehicle on the basis of the determined schedule; and causing a display unit to display information representing a position or a section at which the subject vehicle accelerates or decelerates in the speed control in association with information representing the running locus on the basis of the determined schedule.

Advantageous Effects of Invention

According to the inventions described in claims 1, 9, and 10, by displaying details of display of the display unit, a vehicle occupant is allowed to intuitively acquire details of speed control of acceleration/deceleration (one or both of acceleration and deceleration) and the like according to automated driving.

According to the inventions described in claim 2, a vehicle occupant is allowed to know a position or a section at which the subject vehicle accelerates or decelerates in speed control more assuredly.

According to the invention described in claim 3, an action of the subject vehicle according to automated driving in the future can be represented more clearly. Accordingly, a vehicle occupant can prepare for a lane change, speed control, and the like.

According to the invention described in claim 4, a vehicle occupant can acquire control details of speed control and the like according to automated driving more intuitively through the head-up display.

According to the invention described in claim 5, it can be easily acquired that a position and a section at which the subject vehicle accelerates or decelerates in speed control can be changed.

According to the invention described in claims 6 and 8, a vehicle occupant can easily adjust a timing at which the subject vehicle accelerates or decelerates in speed control. Accordingly, a vehicle occupant can perform the speed control at an appropriate timing in accordance with statuses of a current posture and the like.

According to the invention described in claim 7, a vehicle occupant can acquire information after change before the schedule is changed.

DESCRIPTION OF EMBODIMENTS

Hereinafter, a vehicle control system, a vehicle control method, and a vehicle control program according to embodiments of the present invention will be described with reference to the drawings.

<Common Configuration>

Figure 1:
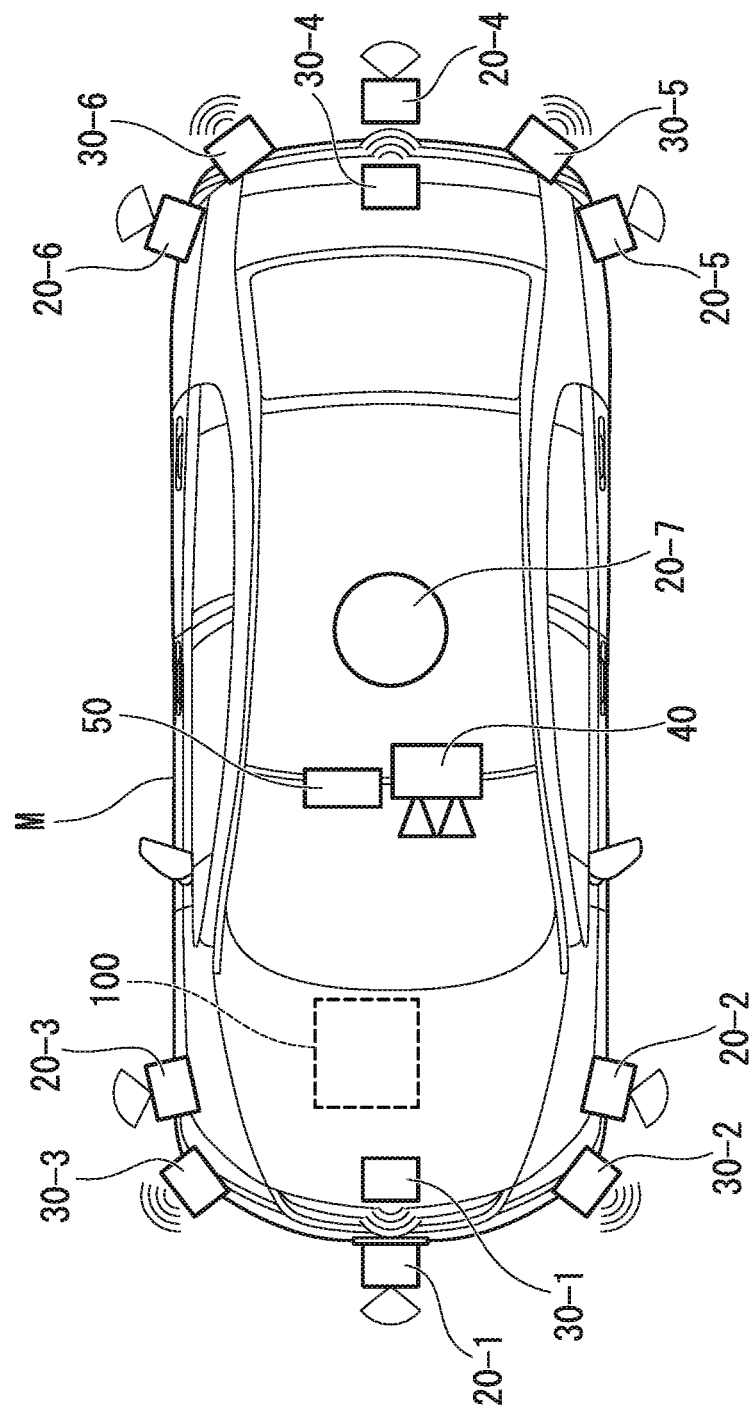
FIG. 1 is a diagram illustrating constituent elements of a vehicle in which a vehicle control system 100 according to an embodiment is mounted.

FIG. 1 is a diagram illustrating constituent elements of a vehicle (hereinafter referred to as a subject vehicle M) in which a vehicle control system 100 according to an embodiment is mounted. A vehicle in which the vehicle control system 100 is mounted, for example, may be a vehicle with two wheels, three wheels, four wheels, or the like and includes an automobile having an internal combustion engine such as a diesel engine or a gasoline engine as its power source, an electric vehicle having a motor as its power source, a hybrid vehicle equipped with both an internal combustion engine and a motor, and the like. The electric vehicle described above, for example, is driven using electric power discharged by a cell such as a secondary cell, a hydrogen fuel cell, a metal fuel cell, an alcohol fuel cell, or the like.

As illustrated in FIG. 1, sensors such as finders 20-1 to 20-7, radars 30-1 to 30-6, a camera 40, and the like, a navigation device 50, and a vehicle control system 100 are mounted in the subject vehicle M.

Each of the finders 20-1 to 20-7 is a light detection and ranging or a laser imaging detection and ranging (LIDAR) device measuring a distance to a target by measuring scattered light from emitted light. For example, the finder 20-1 is mounted on a front grille or the like, and the finders 20-2 and 20-3 are mounted on a side of a vehicle body, door mirrors, inside head lights, near side lights, or the like. The finder 20-4 is mounted in a trunk lid or the like, and the finders 20-5 and 20-6 are mounted on the side of the vehicle body, inside tail lamps or the like. Each of the finders 20-1 to 20-6 described above, for example, has a detection area of about 150 degrees with respect to a horizontal direction. In addition, the finder 20-7 is mounted on a roof or the like. For example, the finder 20-7 has a detection area of 360 degrees with respect to a horizontal direction.

The radars 30-1 and 30-4, for example, are long-distance millimeter wave radars having a wider detection area in a depth direction than that of the other radars. In addition, the radars 30-2, 30-3, 30-5, and 30-6 are middle-distance millimeter wave radars having a narrower detection area in a depth direction than that of the radars 30-1 and 30-4.

Hereinafter, in a case in which the finders 20-1 to 20-7 are not particularly distinguished from each other, one thereof will be simply referred to as a "finder 20," and, in a case in which the radars 30-1 to 30-6 are not particularly distinguished from each other, one thereof will be simply referred to as a "radar 30." The radar 30, for example, detects an object using a frequency modulated continuous wave (FM-CW) system.

The camera 40, for example, is a digital camera using a solid-state imaging device such as a charge coupled device (CCD), a complementary metal oxide semiconductor (CMOS), or the like. The camera 40 is mounted in an upper part of a front windshield, a rear face of a rearview mirror, or the like. The camera 40, for example, repeats imaging of the side in front of the subject vehicle M periodically. The camera 40 may be a stereo camera including a plurality of cameras.

The configuration illustrated in FIG. 1 is merely one example, and a part of the configuration may be omitted, and other different components may be added.

Figure 2:
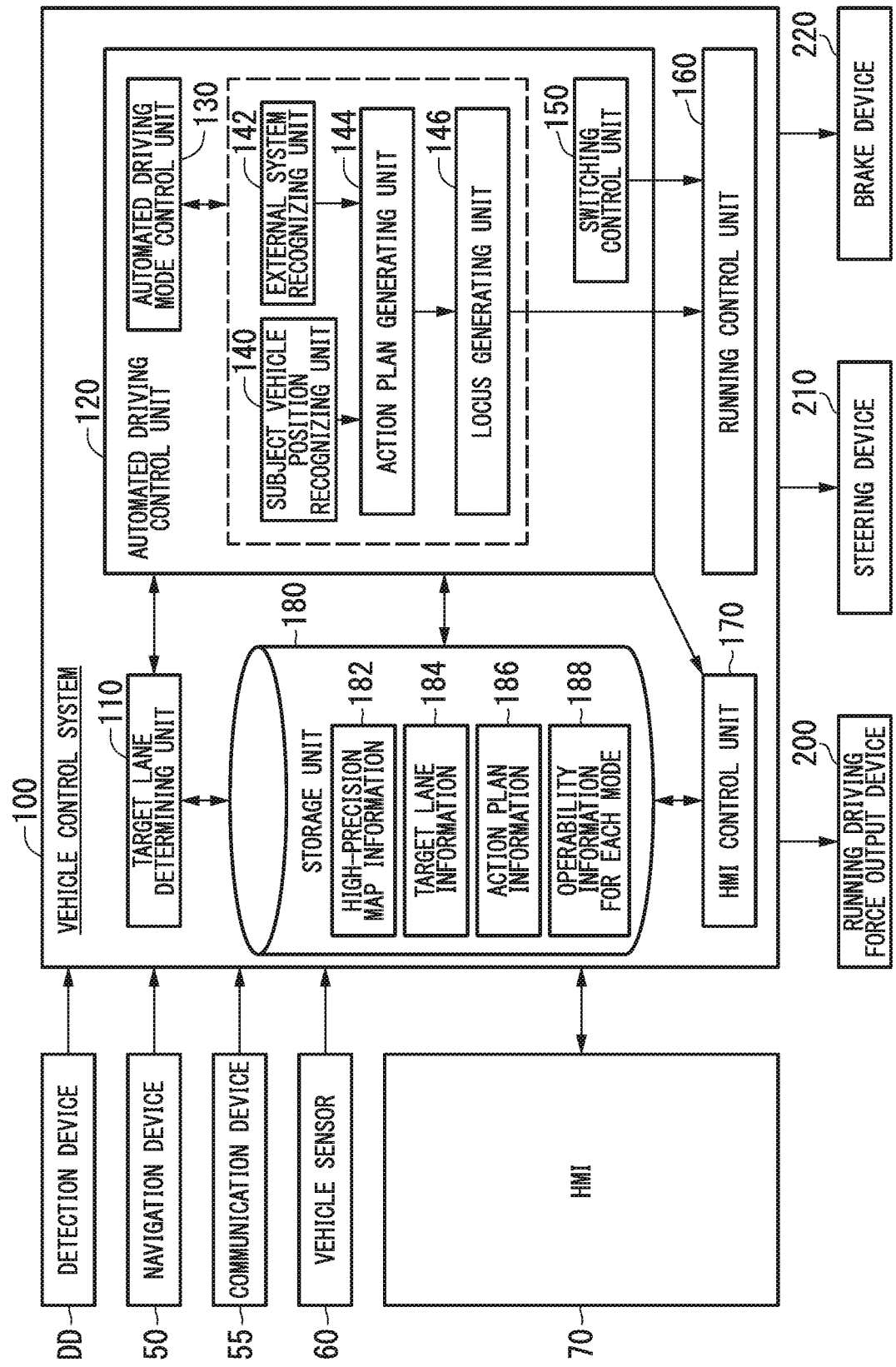
FIG. 2 is functional configuration diagram focusing on a vehicle control system 100 according to an embodiment.

FIG. 2 is functional configuration diagram focusing on a vehicle control system 100 according to a first embodiment. In the subject vehicle M, a detection device DD including finders 20, radars 30, a camera 40, and the like, a navigation device 50, a communication device 55, a vehicle sensor 60, a human machine interface (HMI) 70, a vehicle control system 100, a running driving force output device 200, a steering device 210, and a brake device 220 are mounted. Such devices and units are interconnected through a multiple-communication line such as a controller area network (CAN) communication line, a serial communication line, a radio communication network, or the like. A vehicle control system described in the claims may represent not only the "vehicle control system 100" but may include components (the detection unit DD, the HMI 70, and the like) other than the vehicle control system 100.

The navigation device 50 includes a global navigation satellite system (GNSS) receiver, map information (navigation map), a touch panel-type display device functioning as a user interface, a speaker, a microphone, and the like. The navigation device 50 identifies a location of the subject vehicle M using the GNSS receiver and derives a route from the location to a destination designated by a user (a vehicle occupant or the like). The route derived by the navigation device 50 is provided to a target lane determining unit 110 of the vehicle control system 100. The location of the subject vehicle M may be identified or complemented by an inertial navigation system (INS) using an output of the vehicle sensor 60. In addition, when the vehicle control system 100 implements a manual driving mode, the navigation device 50 performs guidance using speech or a navigation display for a route to the destination. Components used for identifying the location of the subject vehicle M may be disposed to be independent from the navigation device 50. In addition, the navigation device 50, for example, may be realized by a function of a terminal device such as a smartphone, a tablet terminal, or the like held by a vehicle occupant (occupant) of the subject vehicle M. In such a case, information is transmitted and received using wireless or wired communication between the terminal device and the vehicle control system 100.

The communication device 55, for example, performs radio communication using a cellular network, a Wi-Fi network, Bluetooth (registered trademark), a dedicated short range communication (DSRC), or the like.

The vehicle sensor 60 includes a vehicle speed sensor detecting a vehicle speed, an acceleration sensor detecting an acceleration, a yaw rate sensor detecting an angular velocity around a vertical axis, an azimuth sensor detecting the azimuth of the subject vehicle M, and the like.

Figure 3:
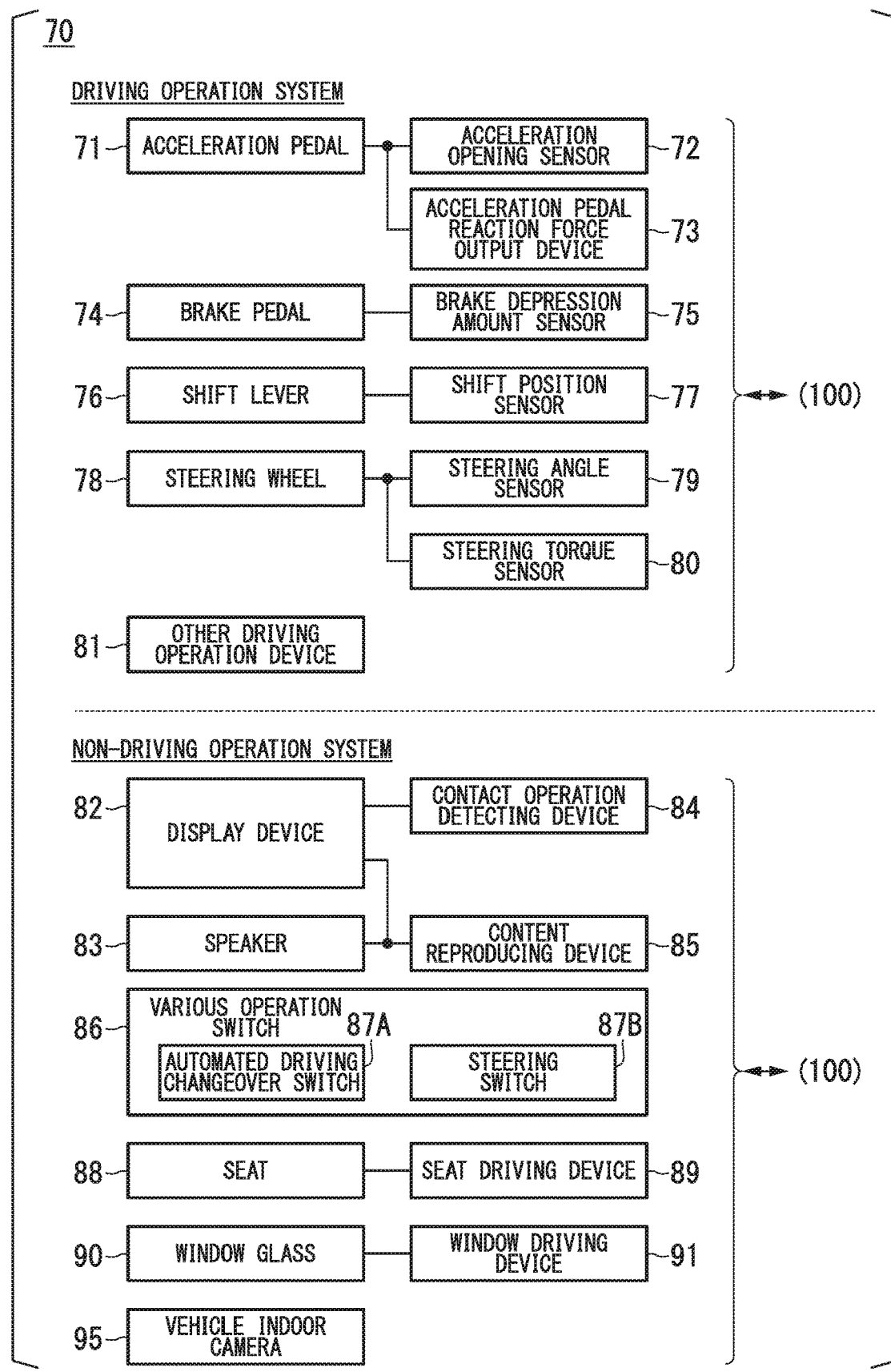
FIG. 3 is a configuration diagram of an HMI 70.

FIG. 3 is a configuration diagram of the HMI 70. The HMI 70, for example, includes a configuration of a driving operation system and a configuration of a non-driving operation system. A boundary therebetween is not clear, and a configuration of a driving operation system may have a function of a non-driving operation system (or the reverse). A part of the HMI 70 is one example of an operation receiving unit and also is one example of a display unit.

For the configuration of the driving operation system, the HMI 70, for example, includes an acceleration pedal 71, an acceleration opening sensor 72, an acceleration pedal reaction force output device 73, a brake pedal 74, a brake depression amount sensor (or a master pressure sensor or the like) 75, a shift lever 76, a shift position sensor 77, a steering wheel 78, a steering angle sensor 79, a steering torque sensor 80, and other driving operation devices 81.

The acceleration pedal 71 is an operator that is used for receiving an acceleration direction (or a deceleration direction using a returning operation) from a vehicle occupant. The acceleration opening sensor 72 detects a depression amount of the acceleration pedal 71 and outputs an acceleration opening signal representing the depression amount to the vehicle control system 100. In addition, instead of outputting the acceleration opening signal to the vehicle control system 100, the acceleration opening signal may be directly output to the running driving force output device 200, the steering device 210, or the brake device 220. This similarly applies also to the configuration of the other driving operation system described below. The acceleration pedal reaction force output device 73, for example, outputs a force in a direction opposite to an operation direction (operation reaction force) to the acceleration pedal 71 in response to a direction from the vehicle control system 100.

The brake pedal 74 is an operator that is used for receiving a deceleration direction from a vehicle occupant. The brake depression amount sensor 75 detects a depression amount (or a depressing force) of the brake pedal 74 and outputs a brake signal representing a result of the detection to the vehicle control system 100.

The shift lever 76 is an operator that is used for receiving a direction for changing a shift level from a vehicle occupant. The shift position sensor 77 detects a shift level directed from a vehicle occupant and outputs a shift position signal representing a result of the detection to the vehicle control system 100.

The steering wheel 78 is an operator that is used for receiving a turning direction from a vehicle occupant. The steering angle sensor 79 detects an operation angle of the steering wheel 78 and outputs a steering angle signal representing a result of the detection to the vehicle control system 100. The steering torque sensor 80 detects a torque applied to the steering wheel 78 and outputs a steering torque signal representing a result of the detection to the vehicle control system 100.

The other driving operation devices 81, for example, are buttons, a joystick, a dial switch, a graphical user interface (GUI) switch, and the like. The other driving operation devices 81 receive an acceleration direction, a deceleration direction, a turning direction, and the like and output the received directions to the vehicle control system 100.

For the configuration of the non-driving operation system, the HMI 70, for example, includes a display device 82, a speaker 83, a contact operation detecting device 84, a content reproducing device 85, various operation switches 86, a seat 88, a seat driving device 89, a window glass 90, a window driving device 91, and a vehicle indoor camera 95.

The display device 82, for example, is a liquid crystal display (LCD), an organic electroluminescence (EL) display device, or the like attached at an arbitrary position facing each part of the instrument panel, an assistant driver's seat, or a rear seat. In addition, the display device 82 may be a head up display (HUD) that projects an image onto a front windshield or any other window. The speaker 83 outputs speech. In a case in which the display device 82 is a touch panel, the contact operation detecting device 84 detects a contact position (touch position) on a display screen of the display device 82 and outputs the detected contact position to the vehicle control system 100. On the other hand, in a case in which the display device 82 is not a touch panel, the contact operation detecting device 84 may be omitted.

The content reproducing device 85, for example, includes a digital versatile disc (DVD) reproduction device, a compact disc (CD) reproduction device, a television set, a device for generating various guidance images, and the like. A part or whole of each of the display device 82, the speaker 83, the contact operation detecting device 84, and the content reproducing device 85 may be configured to be shared by the navigation device 50.

The various operation switches 86 are disposed at arbitrary positions inside a vehicle cabin. The various operation switches 86 includes an automated driving changeover switch 87A that directs starting (or starting in the future) and stopping of automated driving and a steering switch 87B that switches display details in each display unit (for example, the navigation device 50, the display device 82, or the content reproducing device 85) or the like. Each of the automated driving changeover switch 87A and the steering switch 87B may be one of a graphical user interface (GUI) switch and a mechanical switch. In addition, the various operation switches 86 may include switches used for driving the seat driving device 89 and the window driving device 91. When an operation is received from a vehicle occupant, the various operation switches 86 output an operation signal to the vehicle control system 100.

The seat 88 is a seat on which a vehicle occupant sits. The seat driving device 89 freely drives a reclining angle, a forward/backward position, a yaw rate, and the like of the seat 88. The window glass 90, for example, is disposed in each door. The window driving device 91 drives opening and closing of the window glass 90.

The vehicle indoor camera 95 is a digital camera that uses solid-state imaging devices such as CCDs or CMOSs. The vehicle indoor camera 95 is attached at a position such as a rearview mirror, a steering boss unit, or an instrument panel at which at least a head part of a vehicle occupant performing a driving operation can be imaged. The camera 40, for example, repeatedly images a vehicle occupant periodically.

Before description of the vehicle control system 100, the running driving force output device 200, the steering device 210, and the brake device 220 will be described.

The running driving force output device 200 outputs a running driving force (torque) used for running the vehicle to driving wheels. For example, the running driving force output device 200 includes an engine, a transmission, and an engine control unit (ECU) controlling the engine in a case in which the subject vehicle M is an automobile having an internal combustion engine as its power source, includes a running motor and a motor ECU controlling the running motor in a case in which the subject vehicle M is an electric vehicle having an electric motor as its power source, and includes an engine, a transmission, an engine ECU, a running motor, and a motor ECU in a case in which the subject vehicle M is a hybrid vehicle. In a case in which the running driving force output device 200 includes only an engine, the engine ECU adjusts a throttle opening degree, a shift level, and the like of the engine in accordance with information input from a running control unit 160 to be described later. On the other hand, in a case in which the running driving force output device 200 includes only a running motor, the motor ECU adjusts a duty ratio of a PWM signal given to the running motor in accordance with information input from the running control unit 160. In a case in which the running driving force output device 200 includes an engine and a running motor, an engine ECU and a motor ECU control a running driving force in cooperation with each other in accordance with information input from the running control unit 160.

The steering device 210, for example, includes a steering ECU and an electric motor. The electric motor, for example, changes the direction of a steering wheel by applying a force to a rack and pinion mechanism. The steering ECU changes the direction of the steering wheels by driving the electric motor in accordance with information input from the vehicle control system 100 or information of a steering angle or a steering torque that is input.

The brake device 220, for example, is an electric servo brake device including a brake caliper, a cylinder delivering hydraulic pressure to the brake caliper, an electric motor generating hydraulic pressure in the cylinder, and a brake control unit. The brake control unit of the electric servo brake device performs control of the electric motor in accordance with information input from the running control unit 160 such that a brake torque according to a braking operation is output to each vehicle wheel. The electric servo brake device may include a mechanism delivering hydraulic pressure generated by an operation of the brake pedal to the cylinder through a master cylinder as a backup. In addition, the brake device 220 is not limited to the electric servo brake device described above and may be an electronic control-type hydraulic brake device. The electronic control-type hydraulic brake device delivers hydraulic pressure of the master cylinder to the cylinder by controlling an actuator in accordance with information input from the running control unit 160. In addition, the brake device 220 may include a regenerative brake using the running motor which can be included in the running driving force output device 200.

[Vehicle Control System]

Hereinafter, the vehicle control system 100 will be described. The vehicle control system 100, for example, is realized by one or more processors or hardware having functions equivalent thereto. The vehicle control system 100 may be configured by combining an electronic control unit (ECU), a micro-processing unit (MPU), or the like in which a processor such as a central processing unit (CPU), a storage device, and a communication interface are interconnected through an internal bus.

Referring to FIG. 2, the vehicle control system 100, for example, includes a target lane determining unit 110, an automated driving control unit 120, a running control unit 160, and a storage unit 180.

The automated driving control unit 120, for example, includes, an automated driving mode control unit 130, a subject vehicle position recognizing unit 140, an external system recognizing unit 142, an action plan generating unit 144, a locus generating unit 146, and a switching control unit 150.

The locus generating unit 146 and the running control unit 160 are examples of a "control unit."

Some or all of the target lane determining unit 110, each unit of the automated driving control unit 120, and the running control unit 160 may be realized by a processor executing a program (software). In addition, some or all of these may be realized by hardware such as a large scale integration (LSI) or an application specific integrated circuit (ASIC) or may be realized by combining software and hardware.

In the storage unit 180, for example, information such as high-precision map information 182, target lane information 184, action plan information 186, operability information 188 for each mode, and the like are stored. The storage unit 180 is realized by a read only memory (ROM), a random access memory (RAM), a hard disk drive (HDD), a flash memory, or the like. A program executed by the processor may be stored in the storage unit 180 in advance or may be downloaded from an external device through in-vehicle internet facilities or the like. In addition, a program may be installed in the storage unit 180 by mounting a portable-type storage medium storing the program in a drive device not illustrated in the drawing. Furthermore, a computer of the vehicle control system 100 (in-vehicle computer) may be distributed in a plurality of computer devices.

The target lane determining unit 110, for example, is realized by an MPU. The target lane determining unit 110 divides a route provided from the navigation device 50 into a plurality of blocks (for example, divides the route at every 100 [m] in the vehicle advancement direction) and determines a target lane for each block by referring to the high-precision map information 182. The target lane determining unit 110, for example, determines a lane, in which the subject vehicle runs, represented using a position from the left side. For example, in a case in which a branching point, a merging point, or the like is present in the route, the target lane determining unit 110 determines a target lane such that the subject vehicle M can run in a running route that is rational for advancing to a branching destination. The target lane determined by the target lane determining unit 110 is stored in the storage unit 180 as target lane information 184.

The high-precision map information 182 is a map information having higher precision than that of the navigation map included in the navigation device 50. The high-precision map information 182, for example, includes information of the center of a lane or information of boundaries of a lane and the like. In addition, in the high-precision map information 182, road information, traffic regulations information, address information (an address and a zip code), facilities information, telephone number information, and the like may be included. In the road information, information representing a type of road such as an expressway, a toll road, a national road, or a prefectural road and information such as the number of lanes of a road, a width of each lane, a gradient of a road, the position of a road (three-dimensional coordinates including longitude, latitude, and a height), a curvature of the curve of a lane, locations of merging and branching points of lanes, signs installed on a road, and the like are included. In the traffic regulations information, information of closure of a lane due to roadwork, traffic accidents, congestion, or the like is included.

The automated driving mode control unit 130 determines a mode of automated driving performed by the automated driving control unit 120. Modes of automated driving according to this embodiment include the following modes. The following are merely examples, and the number of modes of automated driving may be arbitrarily determined.

[Mode A]

A mode A is a mode of which the degree of automated driving is the highest. In a case in which the mode A is implemented, the entire vehicle control such as complicated merging control is automatically performed, and accordingly, a vehicle occupant does not need to monitor the vicinity or the state of the subject vehicle M.

[Mode B]

A mode B is a mode of which a degree of automated driving is the second highest after the mode A. In a case in which the mode B is implemented, generally, the entire vehicle control is automatically performed, but a driving operation of the subject vehicle M may be given over to a vehicle occupant in accordance with situations. For this reason, the vehicle occupant needs to monitor the vicinity and the state of the subject vehicle M.

[Mode C]

A mode C is a mode of which a degree of automated driving is the third highest after the mode B. In a case in which the mode C is implemented, a vehicle occupant needs to perform a checking operation according to situations on the HMI 70. In the mode C, for example, in a case in which a timing for a lane change is notified to a vehicle occupant, and the vehicle occupant performs an operation of directing a lane change for the HMI 70, automated lane change is performed. For this reason, the vehicle occupant needs to monitor the vicinity and the state of the subject vehicle M.

The automated driving mode control unit 130 determines a mode of automated driving on the basis of a vehicle occupant's operation on the HMI 70, an event determined by the action plan generating unit 144, and a running mode determined by the locus generating unit 146. The mode of automated driving is notified to the HMI control unit 170. In addition, in the mode of automated driving, a limit according to the performance and the like of the detection device DD of the subject vehicle M may be set. For example, in a case in which the performance of the detection device DD is low, the mode A may not be executed. In both modes, switching to a manual driving mode (overriding) can be made by performing an operation on the configuration of the driving operation system of the HMI 70.

The subject vehicle position recognizing unit 140 recognizes a lane (running lane) in which the subject vehicle M is running and a relative position of the subject vehicle M with respect to the running lane on the basis of the high-precision map information 182 stored in the storage unit 180 and information input from the finder 20, the radar 30, the camera 40, the navigation device 50, or the vehicle sensor 60.

For example, the subject vehicle position recognizing unit 140 compares a pattern of road partition lines recognized from the high-precision map information 182 (for example, an array of solid lines and broken lines) with a pattern of road partition lines in the vicinity of the subject vehicle M that has been recognized from an image captured by the camera 40, thereby recognizing a running lane. In the recognition, the position of the subject vehicle M acquired from the navigation device 50 or a result of the process executed by an INS may be additionally taken into account.

Figure 4:
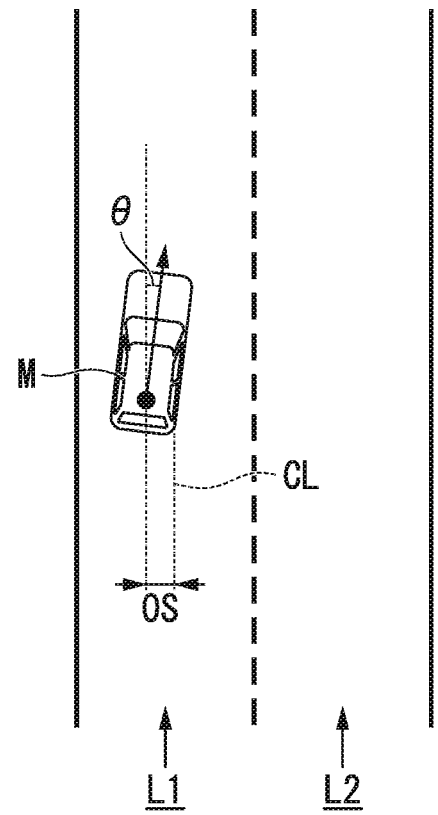
FIG. 4 is a diagram illustrating a view in which a relative position of a subject vehicle M with respect to a running lane L1 is recognized by a subject vehicle position recognizing unit 140.

FIG. 4 is a diagram illustrating a view in which a relative position of a subject vehicle M with respect to a running lane L1 is recognized by the subject vehicle position recognizing unit 140. For example, the subject vehicle position recognizing unit 140 recognizes an offset OS of a reference point (for example, the center of gravity) of the subject vehicle M from the center CL of the running lane and an angle θ of an advancement direction of the subject vehicle M formed with respect to a line along the center CL of the running lane as a relative position of the subject vehicle M with respect to the running lane L1. In addition, instead of this, the subject vehicle position recognizing unit 140 may recognize a position of a reference point on the subject vehicle M with respect to a side end part of the own lane L1 and the like as a relative position of the subject vehicle M with respect to the running lane. The relative position of the subject vehicle M recognized by a subject vehicle position recognizing unit 140 is provided to the target lane determining unit 110.

The external system recognizing unit 142 recognizes states of each surrounding vehicle such as a position, a speed, an acceleration, and the like thereof on the basis of information input from the finder 20, the radar 30, the camera 40, and the like. For example, a surrounding vehicle is a vehicle running in the vicinity of the subject vehicle M and is a vehicle running in the same direction as that of the subject vehicle M. The position of a surrounding vehicle may be represented as a representative point on another vehicle such as the center of gravity, a corner, or the like and may be represented by an area represented by the contour of another vehicle. The "state" of a surrounding vehicle is acquired on the basis of information of various devices described above and may include an acceleration of a surrounding vehicle and whether or not a lane is being changed (or whether or not a lane is to be changed). In addition, the external system recognizing unit 142 may recognize positions of a guard rail and a telegraph pole, a parked vehicle, a pedestrian, a fallen object, a crossing, traffic lights, a signboard mounted near a construction site or the like, and other objects in addition to the surrounding vehicles.

The action plan generating unit 144 sets a start point of automated driving and/or a destination of automated driving. The start point of automated driving may be the current position of the subject vehicle M or a point at which an operation directing automated driving is performed. The action plan generating unit 144 generates an action plan for a section between the start point and a destination of automated driving. The section is not limited thereto, and the action plan generating unit 144 may generate an action plan for an arbitrary section.

The action plan, for example, is configured of a plurality of events that are sequentially executed. The events, for example, include a deceleration event of decelerating the subject vehicle M, an acceleration event of accelerating the subject vehicle M, a lane keeping event of causing the subject vehicle M to run without deviating from a running lane, a lane changing event of changing a running lane, an overtaking event of causing the subject vehicle M to overtake a vehicle running ahead, a branching event of changing lane to a desired lane at a branching point or causing the subject vehicle M to run without deviating from a current running lane, a merging event of accelerating/decelerating the subject vehicle M and changing a running lane in a merging lane for merging into a main lane (for example, speed control including one or both of acceleration and deceleration), and a handover event of transitioning from a manual driving mode to an automated driving mode at a start point of automated driving or transitioning from an automated driving mode to a manual driving mode at a planned end point of automated driving, and the like. The action plan generating unit 144 sets a lane changing event, a branching event, or a merging event at a place at which a target lane determined by the target lane determining unit 110 is changed. Information representing the action plan generated by the action plan generating unit 144 is stored in the storage unit 180 as action plan information 186.

Figure 5:
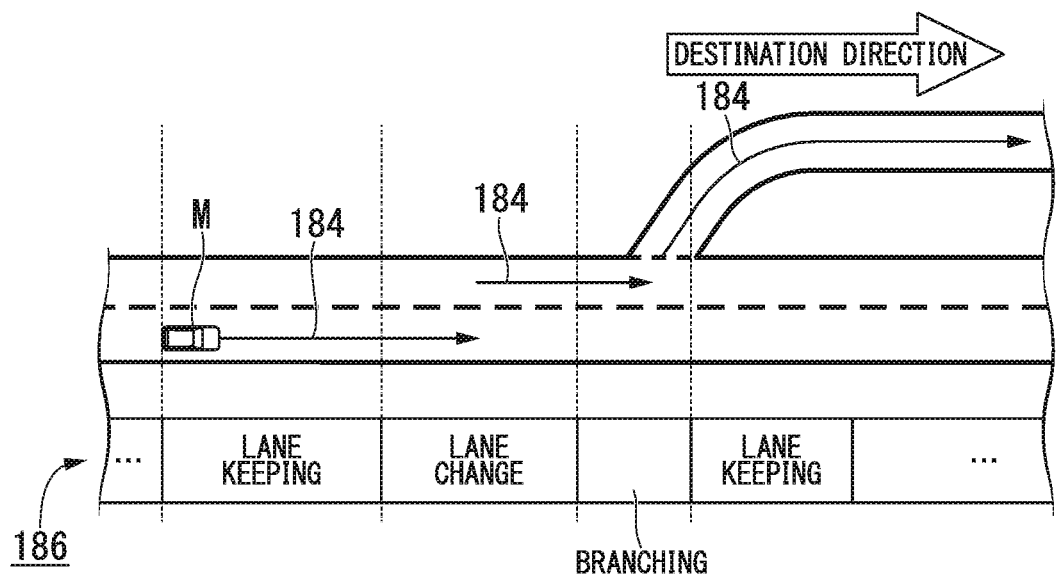
FIG. 5 is a diagram illustrating one example of an action plan generated for a certain section.

FIG. 5 is a diagram illustrating one example of an action plan generated for a certain section. As illustrated in the drawing, the action plan generating unit 144 generates an action plan that is necessary for the subject vehicle M to run on a target lane indicated by the target lane information 184. In addition, the action plan generating unit 144 may dynamically change the action plan in accordance with a change in the status of the subject vehicle M regardless of the target lane information 184. For example, in a case in which a speed of a surrounding vehicle recognized during the running of the vehicle by the external system recognizing unit 142 exceeds a threshold, or a moving direction of a surrounding vehicle running on a lane adjacent to the own lane (running lane) is directed toward the direction of the own lane, the action plan generating unit 144 may change the event set in a driving section on which the subject vehicle M plans to run. For example, in a case in which an event is set such that a lane changing event is executed after a lane keeping event, when it is determined that a vehicle is running at a speed that is a threshold or more from behind in a lane that is a lane change destination during the lane keeping event in accordance with a result of the recognition of the external system recognizing unit 142, the action plan generating unit 144 may change the next event after a lane keeping event from a lane changing event to a deceleration event, a lane keeping event, or the like. As a result, also in a case in which a change in the state of the external system occurs, the vehicle control system 100 can cause the subject vehicle M to safely run automatically.

Figure 6:
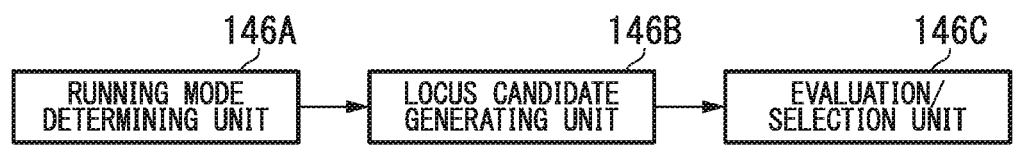
FIG. 6 is a diagram illustrating one example of the configuration of a locus generating unit 146.

FIG. 6 is one example of the configuration of the locus generating unit 146. The locus generating unit 146, for example, includes a running mode determining unit 146A, a locus candidate generating unit 146B, and an evaluation/selection unit 146C.

When the lane keeping event is executed, the running mode determining unit 146A determines one running mode among constant-speed running, following running, low-speed following running, decelerating running, curve running, obstacle avoidance running, and the like. For example, in a case in which another vehicle is not present in front of the subject vehicle M, the running mode determining unit 146A may determine constant-speed running as the running mode. In addition, in a case in which following running for a vehicle running ahead is to be executed, the running mode determining unit 146A may determine following running as the running mode. In addition, in the case of a congestion situation or the like, the running mode determining unit 146A may determine low-speed following running as the running mode. Furthermore, in a case in which deceleration of a vehicle running ahead is recognized by the external system recognizing unit 142 or in a case in which an event of stopping, parking, or the like is to be executed, the running mode determining unit 146A may determine decelerating running as the running mode. In addition, in a case in which the subject vehicle M is recognized to have reached a curved road by the external system recognizing unit 142, the running mode determining unit 146A may determine the curve running as the running mode. Furthermore, in a case in which an obstacle is recognized in front of the subject vehicle M by the external system recognizing unit 142, the running mode determining unit 146A may determine the obstacle avoidance running as the running mode.

Figure 7:
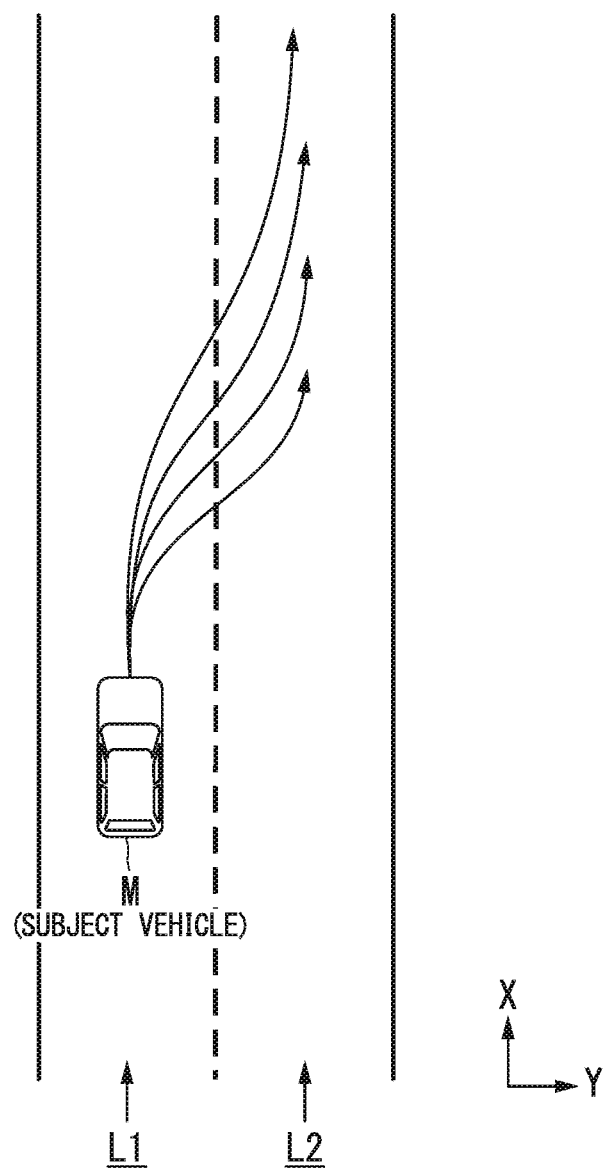
FIG. 7 is a diagram illustrating one example of candidates for a locus generated by a locus candidate generating unit 146B.

The locus candidate generating unit 146B generates candidates for a locus on the basis of the running mode determined by the running mode determining unit 146A. FIG. 7 is a diagram illustrating one example of candidates for a locus that are generated by the locus candidate generating unit 146B. FIG. 7 illustrates candidates for loci generated in a case in which a subject vehicle M changes lanes from a lane L1 to a lane L2.

Figure 8:
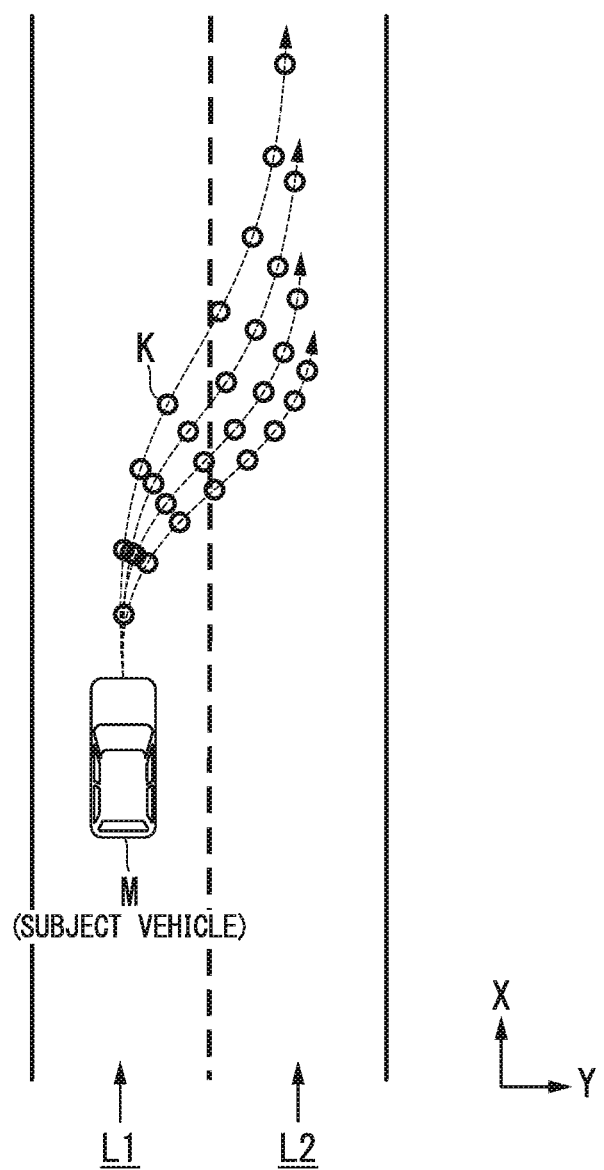
FIG. 8 is a diagram in which candidates for a locus generated by a locus candidate generating unit 146B are represented using locus points K.

The locus candidate generating unit 146B, for example, determines loci as illustrated in FIG. 7 as aggregations of target positions (locus points K) that the reference position (for example, the center of gravity or the center of a rear wheel shaft) of the subject vehicle M will reach at predetermined times in the future. FIG. 8 is a diagram in which candidates for a locus generated by the locus candidate generating unit 146B are represented using locus points K. When a gap between the locus points K becomes wider, the speed of the subject vehicle M increases. On the other hand, when a gap between the locus points K becomes narrower, the speed of the subject vehicle M decreases. Thus, in a case in which acceleration is desired, the locus candidate generating unit 146B gradually increases the gap between the locus points K. On the other hand, in a case in which deceleration is desired, the locus candidate generating unit 146B gradually decreases the gap between the locus points.

In this way, since the locus points K include a speed component, the locus candidate generating unit 146B needs to give a target speed to each of the locus points K. The target speed is determined in accordance with the running mode determined by the running mode determining unit 146A.

Here, a technique for determining a target speed in a case in which a lane change (including branching) is performed will be described. The locus candidate generating unit 146B, first, sets a lane change target position (or a merging target position). The lane change target position is set as a relative position with respect to a surrounding vehicle and is for determining "surrounding vehicles between which a lane change is performed." The locus candidate generating unit 146B determines a target speed of a case in which a lane change is performed focusing on three surrounding vehicles using the lane change target position as a reference.

Figure 9:
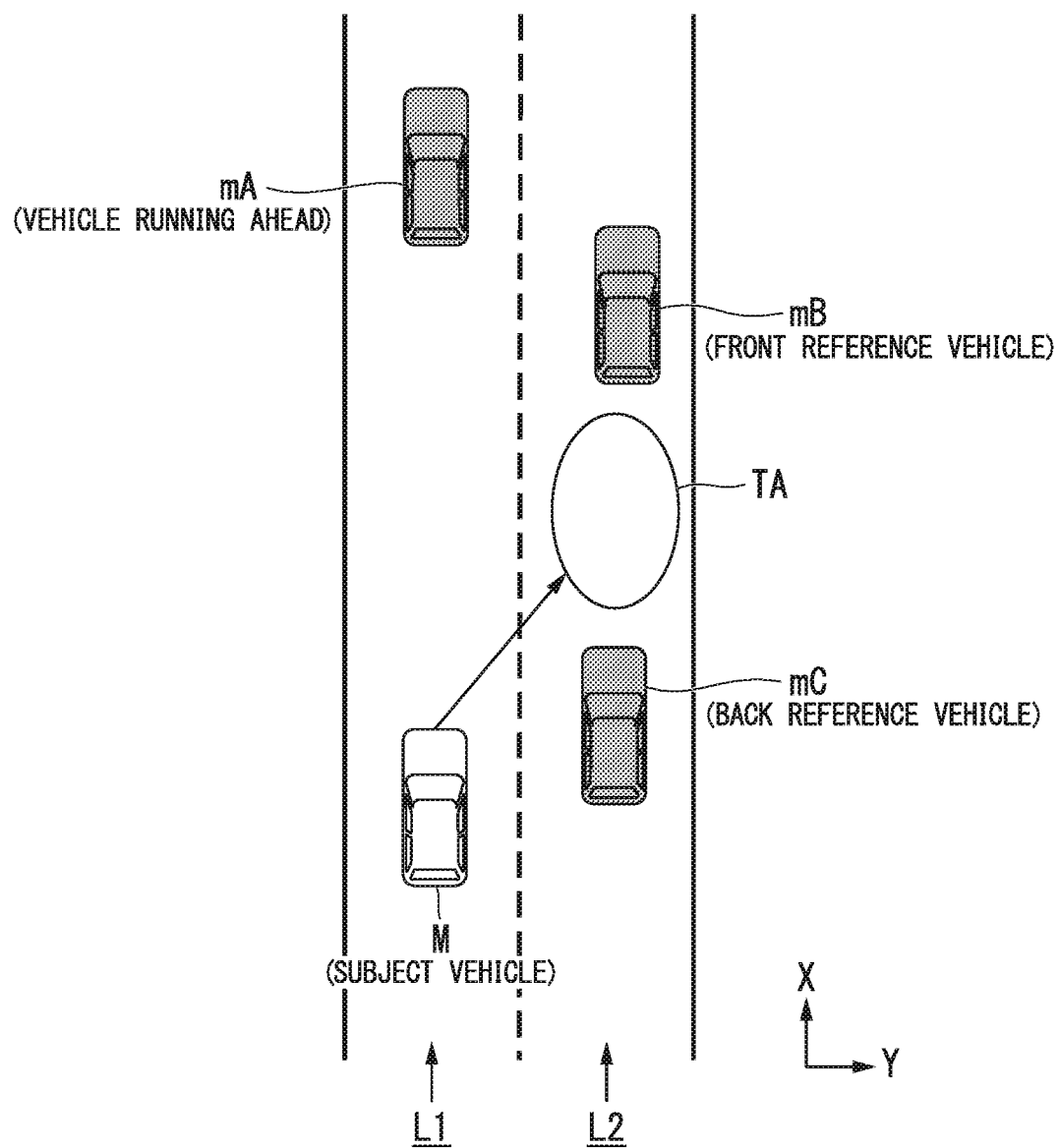
FIG. 9 is a diagram illustrating a lane change target position TA.

FIG. 9 is a diagram illustrating a lane change target position TA. In the drawing, an own lane L1 is illustrated, and an adjacent lane L2 is illustrated. Here, in the same lane as that of the subject vehicle M, a surrounding vehicle running immediately before the subject vehicle M will be defined as a vehicle mA running ahead, a surrounding vehicle running immediately before the lane change target position TA will be defined as a front reference vehicle mB, and a surrounding vehicle running immediately after the lane change target position TA will be defined as a rear reference vehicle mC. When the subject vehicle M needs to perform acceleration/deceleration in order to move to the lateral side of the lane change target position TA, at this time, overtaking the vehicle mA running ahead needs to be avoided. For this reason, the locus candidate generating unit 146B predicts future states of the three surrounding vehicles and sets a target speed such that there is no interference with each of the surrounding vehicles.

Figures 10, 11:
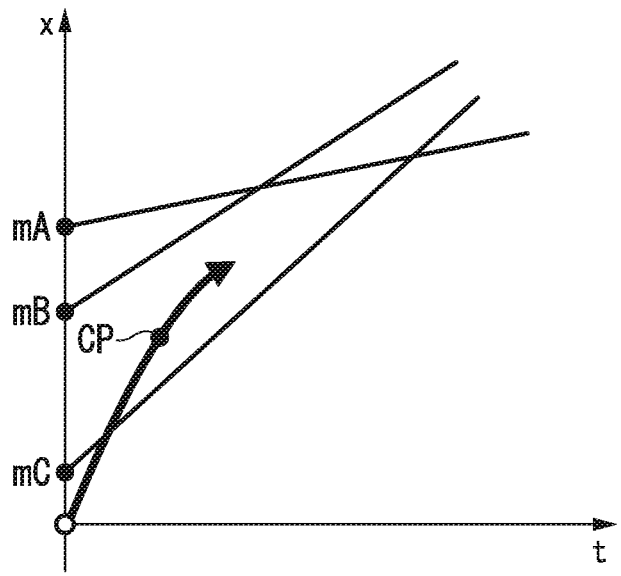
FIG. 10 is a diagram illustrating a speed generation model of a case in which the speeds of three surrounding vehicles are assumed to be constant.
FIG. 11 is a diagram illustrating one example of operability information 188 for each mode.

FIG. 10 is a diagram illustrating a speed generation model of a case in which the speeds of three surrounding vehicles are assumed to be constant. In the drawing, straight lines extending from mA, mB, and mC respectively represent displacements in the advancement direction in a case in which each of the surrounding vehicles is assumed to run at a constant speed. At a point CP at which the lane change is completed, the subject vehicle M needs to be present between the front reference vehicle mB and the back reference vehicle mC and needs to be present behind the vehicle mA running ahead before that. Under such restrictions, the locus candidate generating unit 146B derives a plurality of time series patterns of the target speed before the lane change is completed. Then, by applying the time series patterns of the target speed to a model of a spline curve or the like, a plurality of candidates for loci as illustrated in FIG. 7 described above are derived. In addition, the movement patterns of the three surrounding vehicles are not limited to constant speeds as illustrated in FIG. 10 and may be predicted on the premise of constant accelerations or constant jerks (derivatives of accelerations).

The evaluation/selection unit 146C performs evaluations for the generated candidates for the locus generated by the locus candidate generating unit 146B, for example, from two viewpoints of planning and safety and selects a locus to be output to the running control unit 160. From the viewpoint of planning, for example, a locus is highly evaluated in a case in which the degree of conforming to a plan that has already been generated (for example, an action plan) is high, and the total length of the locus is short. For example, in a case in which it is desirable to perform a lane change to the right side, a locus in which a lane change to the left side is performed temporarily, and then, the subject vehicle returns has a low evaluation. From the viewpoint of safety, for example, in a case in which, at each locus point, a distance between the subject vehicle M and an object (a surrounding vehicle or the like) is long, and the acceleration/deceleration and the amounts of change in the steering angle are small, the locus is highly evaluated.

Here, the action plan generating unit 144 and the locus generating unit 146 described above are one example of a determination unit that determines a schedule of a running locus and acceleration/deceleration of the subject vehicle M. For example, in a case in which a direction for changing a position or a section of acceleration/deceleration that is made by a vehicle occupant of the own vehicle M is in an allowed range of the acceleration/deceleration of the subject vehicle M, the determination unit may change the schedule on the basis of the vehicle occupant's change direction. The change direction described above, for example, can be acquired on the basis of an operation performed by a vehicle occupant on the HMI 70 or the like. In addition, operation details can be acquired through the HMI control unit 170. The locus information and the like associated with the changed schedule are output to the running control unit 160 and the HMI control unit 170.

The switching control unit 150 performs switching between the automated driving mode and the manual driving mode on the basis of a signal input from the automated driving changeover switch 87A. In addition, the switching control unit 150 switches the driving mode from the automated driving mode to the manual driving mode on the basis of an operation directing acceleration, deceleration, or steering for the configuration of the driving operation system of the HMI 70. For example, in a case in which a state, in which the amount of operation represented by a signal input from the configuration of the driving operation system of the HMI 70 exceeds a threshold, is continued for over a reference time, the switching control unit 150 may switch the driving mode from the automated driving mode to the manual driving mode (overriding). In addition, in a case in which an operation for the configuration of the driving operation system of the HMI 70 has not been detected for a predetermined time after switching to the manual driving mode according to overriding, the switching control unit 150 may return the driving mode to the automated driving mode.

The running control unit 160 automatically performs at least speed control of the subject vehicle M on the basis of the schedule determined by the determination unit (the action plan generating unit 144 and the locus generating unit 146) described above. Here, the speed control is control of acceleration including one or both of acceleration and deceleration of the subject vehicle M, for example, of which the amount of change in speed is equal to or greater than a threshold. In addition, the speed control may include constant-speed control that causes the subject vehicle M to run in a constant speed range.

For example, the running control unit 160 controls the running driving force output device 200, the steering device 210, and the brake device 220 such that the subject vehicle M passes along a running locus (locus information) generated (scheduled) by the locus generating unit 146 at a scheduled time. In addition, the running control unit 160 controls acceleration/deceleration of the subject vehicle M in association with the running locus.

When information of a mode of the automated driving is notified from the automated driving control unit 120, the HMI control unit 170 controls the HMI 70 in accordance with the type of the mode of automated driving by referring to the operability information 188 for each mode.

FIG. 11 is a diagram illustrating one example of the operability information 188 for each mode. The operability information 188 for each mode illustrated in FIG. 11 includes a "manual driving mode" and an "automated driving mode" as items of a driving mode. In addition, as the "automated driving mode," the "mode A," the "mode B," the "mode C" described above and the like are included. The operability information 188 for each mode, as items of the non-driving operation system, includes a "navigation operation" that is an operation for the navigation device 50, a "content reproducing operation" that is an operation for the content reproducing device 85, an "instrument panel operation" that is an operation on the display device 82, and the like. In the example of the operability information 188 for each mode illustrated in FIG. 11, although whether or not the vehicle occupant can operate the non-driving operation system is set for each driving mode described above, target interface devices (the display unit and the like) are not limited thereto.

The HMI control unit 170 determines devices (the navigation device 50 and a part or the whole of the HMI 70) that are permitted to be used and devices that are not permitted to be used by referring to the operability information 188 for each mode on the basis of the information of the mode acquired from the automated driving control unit 120. In addition, the HMI control unit 170 controls acceptability of an operation from a vehicle occupant for the HMI 70 or the navigation device 50 of the non-driving operation system on the basis of a result of the determination.

For example, in a case in which the driving mode executed by the vehicle control system 100 is the manual driving mode, the vehicle occupant operates the driving operation system (for example, the acceleration pedal 71, the brake pedal 74, the shift lever 76, the steering wheel 78, or the like) of the HMI 70. On the other hand, in a case in which the driving mode executed by the vehicle control system 100 is the mode B, the mode C, or the like of the automated driving, a vehicle occupant has an obligation of monitoring surroundings of the subject vehicle M. In such a case, in order to prevent the attention of a vehicle occupant from being distracted due to an action (for example, an operation for the HMI 70 or the like) other than driving (driver distraction), the HMI control unit 170 performs control such that an operation for a part or the whole of the non-driving operation system of the HMI 70 is not accepted. At this time, in order to perform monitoring of the surroundings of the subject vehicle M, the HMI control unit 170 may cause the display device 82 to display the presence of surrounding vehicles of the subject vehicle M and states of the sounding vehicles recognized by the external system recognizing unit 142 as an image or the like and cause the HMI 70 to accept a checking operation according to the situations when the subject vehicle M runs.

In addition, in a case in which the driving mode is the mode A of the automated driving, the HMI control unit 170 performs control of alleviating the regulation of driver distraction and accepting a vehicle occupant's operation for the non-driving operation system for which an operation has not been accepted. For example, the HMI control unit 170 causes the display device 82 to display a video, causes the speaker 83 to output speech, or causes the content reproducing device 85 to reproduce a content from a DVD or the like. In addition, in contents produced by the content reproducing device 85, for example, various contents relating to recreation and entertainment of television programs and the like may be included in addition to contents stored in a DVD or the like. A "contents reproducing operation" illustrated in FIG. 11 may represent a contents operation relating to such recreation and entertainment.

Figure 12:
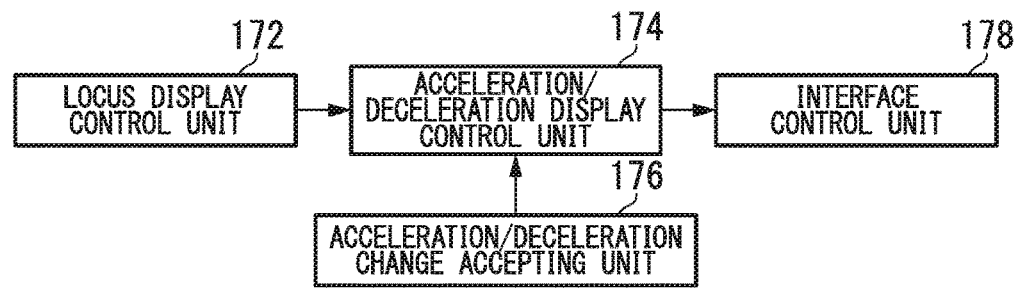
FIG. 12 is a diagram illustrating an example of the functional configuration of an HMI control unit 170.

The HMI control unit 170 causes the display unit (for example, the navigation device 50, the display device 82, or the content reproducing device 85) or the like to display the display information representing a position or a section at which the subject vehicle M accelerates or decelerates in association with information representing the running locus on the basis of the schedule determined by the determination unit (the action plan generating unit 144, the locus generating unit 146, or the like) of the automated driving control unit 120. FIG. 12 is a diagram illustrating an example of the functional configuration of the HMI control unit 170. The HMI control unit 170 illustrated in FIG. 12 includes a locus display control unit 172, an acceleration/deceleration display control unit 174, an acceleration/deceleration change accepting unit 176, and an interface control unit 178. The configuration of each of the locus display control unit 172, the acceleration/deceleration display control unit 174, and the acceleration/deceleration change accepting unit 176 may include the interface control unit 178.

The locus display control unit 172, for example, generates an image acquired by superimposing/integrating a running locus (locus information) in the automated driving generated by the locus generating unit 146 on/with an image captured by the camera 40. For example, the locus display control unit 172 performs control of displaying the running locus of the subject vehicle M on the display unit in accordance with the position information (coordinate information) in an image in the advancement direction captured by the camera 40.

In addition, the locus display control unit 172 displays the running locus in a display form that is different from that of a background of the captured image of the camera 40. It is preferable that the locus display control unit 172 displays the running locus as an object having transparency such that a road in which the subject vehicle is running, surrounding vehicles, and the like are not visible by being hidden due to the display of the running locus The acceleration/deceleration display control unit 174 performs display such that information representing places at which the subject vehicle M accelerates or decelerates (acceleration/deceleration information) in the running locus displayed to be superimposed on or integrated with an image captured by the camera 40 using the locus display control unit 172 is visible for a vehicle occupant. Here, the acceleration/deceleration information is speed control information representing one or both of acceleration and deceleration based on the scheduling determined by the determination unit in the automated driving. In addition, the acceleration/deceleration information includes one or both of positions and sections. For example, in a case in which there is an amount of change with respect to the current vehicle speed or a vehicle speed planned in automated driving that is equal to or greater than a threshold, the acceleration/deceleration information includes a start position, an end position, and a section from the start position to the end position.

The acceleration/deceleration display control unit 174 may display an acceleration and a deceleration in different display forms in display of sections of acceleration/deceleration such that they can be distinguished from each other and may display an acceleration or a deceleration in different forms in accordance with the degree of acceleration or deceleration. Here, the different display forms, for example, are forms in which at least one of colors, shades, illustrations (hatching, marks, or the like), texts, and the like is different. In addition, the acceleration/deceleration display control unit 174 may display a planned speed of the subject vehicle M at a start point or an end point of the acceleration or the deceleration.

The acceleration/deceleration display control unit 174 causes the display unit to display an image in which acceleration/deceleration information representing positions or sections at which the subject vehicle accelerates or decelerates is superimposed on or integrated with an object corresponding to the running locus of the subject vehicle M. Here, the object is a predetermined figure illustrating a running locus but is not limited thereto and may be represented as a predetermined symbol, a pattern, a tone, a line, blinking of a predetermined area, luminance adjustment (for example, a flashing display), or the like. In this way, the action of the subject vehicle in the future according to automated driving can be represented more clearly. Accordingly, a vehicle occupant can prepare for a lane change, acceleration/deceleration, and the like. In addition, the acceleration/deceleration information may be represented at positions different from those of the objects of the running locus.

In addition, the acceleration/deceleration display control unit 174 causes the display unit to output information indicating that output positions or sections at which the subject vehicle M accelerates or decelerates can be changed by a vehicle occupant's operation. Furthermore, while the above-described information indicating that the positions or the sections can be changed is displayed by the display unit, the acceleration/deceleration display control unit 174 changes a position or a section at which the subject vehicle accelerates or decelerates in a case in which a direction for changing acceleration/deceleration (operation details) accepted by the acceleration/deceleration change accepting unit 176 is within an allowed range of the change in the acceleration/deceleration of the subject vehicle M. The determination of whether the direction is within the allowed range of the change is performed by the automated driving control unit 120.

The acceleration/deceleration change accepting unit 176 is one example of an operation accepting unit that accepts a direction for changing the acceleration/deceleration information that is made by the vehicle occupant of the subject vehicle M. The acceleration/deceleration change accepting unit 176 accepts a change direction on the basis of the amount of operation for the HMI 70 or the like that is made by the vehicle occupant of the subject vehicle M. The acceleration/deceleration change accepting unit 176 accepts only a direction for changing the acceleration/deceleration that is operated while the information indicating that positions or sections at which the subject vehicle accelerates or decelerates can be changed is output to the display unit.

The direction for changing the acceleration/deceleration, for example, can be accepted by a driving operation system using the acceleration pedal 71, the brake pedal 74, the steering wheel 78, and other driving operation devices 81, and the like. In this case, in a range not reaching an overriding threshold set in advance for a transition from automated driving to manual driving through overriding (a threshold used for a transition from an automated driving state to overriding according to the amount of operation performed by a vehicle occupant), a position or a section at which the subject vehicle accelerates or decelerates in the speed control is changed in accordance with the amount of operation. For example, a change of the position can be made using the amount of depression of the brake pedal 74, and a change of the section can be performed by steering the steering wheel 78. However, the change direction may be made using other driving operation systems.

The determination unit of the automated driving control unit 120 determines whether or not a change direction accepted from the acceleration/deceleration change accepting unit 176 is in an allowed range of change. For example, the determination unit determines whether or not the running locus that has been generated by the locus generating unit 146 is greatly changed (by a predetermined value or more) in accordance with the change direction. In a case in which the running locus is not greatly changed, the determination unit determines that the details of the change direction made by the vehicle occupant are within the allowed range of change. In a case in which the change direction is within the allowed range of change, the determination unit changes the schedule of the running locus and the acceleration/deceleration of the subject vehicle and outputs the change to the HMI control unit 170. On the other hand, in a case in which the details of the change direction made by the vehicle occupant are outside the allowed range of change, the determination unit rejects the change direction and outputs information representing the rejection to the HMI control unit 170.

In a case in which a position or a section at which the subject vehicle accelerates or decelerates changes in accordance with a result of the determination acquired from the automated driving control unit 120, the acceleration/deceleration display control unit 174 changes the display of the acceleration/deceleration in correspondence with the details of the change. In addition, in a case in which the change of the position or the section at which the subject vehicle accelerates or decelerates is rejected, the acceleration/deceleration display control unit 174 displays an indication representing that the change direction has been rejected without changing the display of the positions or sections at which the vehicle accelerates or decelerates before change.

The interface control unit 178 controls the HMI 70 in accordance with the type of the mode of the automated driving. In addition, the interface control unit 178 causes the display unit to display information representing positions or sections at which the subject vehicle M accelerates or decelerates in the speed control that is acquired by the locus display control unit 172 and the acceleration/deceleration display control unit 174 in association with the information representing the running locus.

Figure 13:
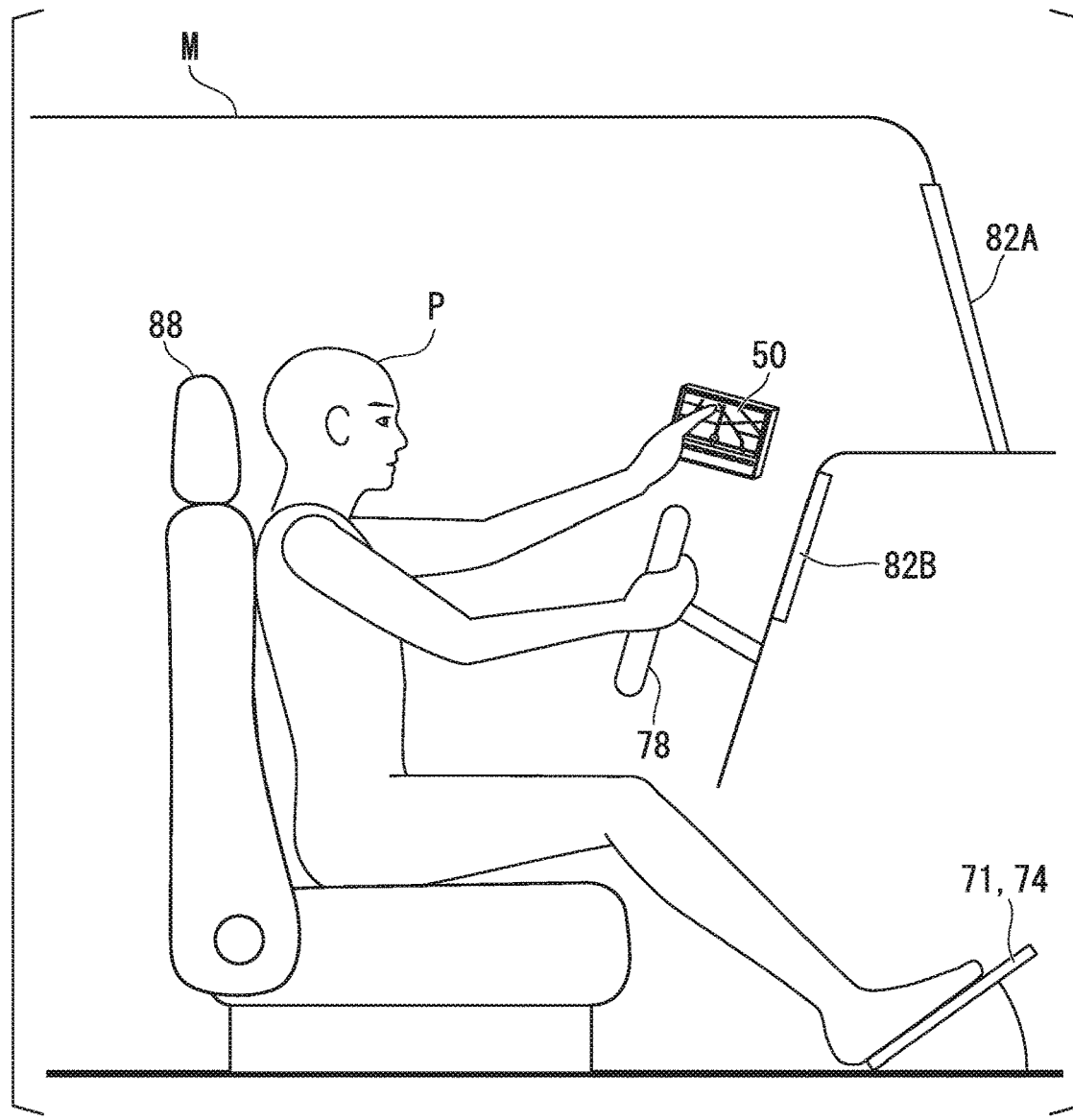
FIG. 13 is a diagram illustrating an acceleration/deceleration display for a display unit and an example of a change.

FIG. 13 is a diagram illustrating an acceleration/deceleration display for the display unit and an example of a change. In the example illustrated in FIG. 13, a state in which a vehicle occupant P of the subject vehicle M sits on a seat 88 is illustrated, and a navigation device 50 and display devices 82A and 82B are illustrated as an example of the display unit installed in the subject vehicle M. Here, the display device 82A is a head-up display (HUD) that is integrally formed with a front windshield (for example, a front glass), and the display device 82B represents a display disposed on an instrument panel. In addition, in the example illustrated in FIG. 13, an acceleration pedal 71, a brake pedal 74, and a steering wheel 78 are illustrated as one example of the driving operation system of the HMI 70.

In this embodiment, in accordance with the control using the HMI control unit 170 described above, an image in which locus information and positions or sections at which the subject vehicle accelerates or decelerates are displayed to be superimposed on or integrated with a captured image captured by the camera 40 is displayed on at least one of the navigation device 50, the display devices 82A and 82B, and the like.

Here, in a case in which the display device 82A is used for the display, the interface control unit 178 projects information representing one or both of positions and sections at which the subject vehicle accelerates or decelerates and the running locus in association with an actual space that is visible through a front windshield that is a projection destination of the HUD. In this way, information such a locus information, acceleration information (acceleration positions or acceleration sections) or the like can be directly displayed on the field of view of the vehicle occupant P of the subject vehicle M. Accordingly, it can be easily known that the positions and the sections at which the subject vehicle accelerates or decelerates can be changed.

In addition, the HMI control unit 170 accepts a vehicle occupant P's operation for the HMI 70 such as the navigation device 50, the display device 82, the acceleration pedal 71, the brake pedal 74, the steering wheel 78, and the like and can change the acceleration/deceleration information (positions or sections) in correspondence with details that have been accepted.

Figure 14:
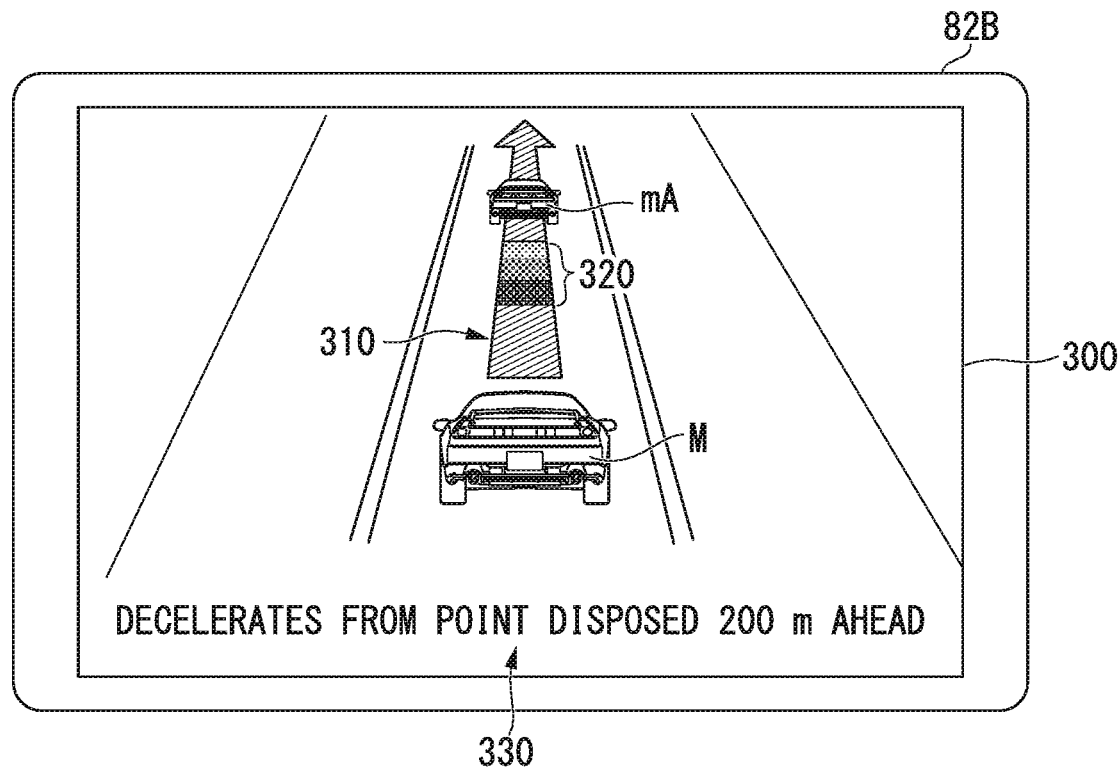
FIG. 14 is a diagram illustrating one example of acceleration/deceleration information output to a display unit.

Here, FIG. 14 is a diagram illustrating one example of the acceleration/deceleration information output to the display unit. In the following description, although the display device 82B disposed on the instrument panel is illustrated as one example of the display unit, the display unit is not limited thereto. In addition, in the example illustrated in FIG. 14, a vehicle mA running ahead the subject vehicle M is present.

In the example illustrated in FIG. 14, an image supplied from the HMI control unit 170 is displayed on a screen 300 of the display device 82B. Here, by displaying the locus information (objects of the running locus) 310 displayed by the locus display control unit 172 to be superimposed on or integrated with the image captured, for example, by the camera 40 using the locus information generated by the locus generating unit 146, the HMI control unit 170 can deliver a behavior (running) of the subject vehicle B to be performed from now on to the vehicle occupant P. The locus information 310 is not limited to straight running but may be a lane change or the like. In addition, the locus information 310 may include information (arrow) representing a direction or the like.

Here, for example, in a case in which the vehicle mA running ahead in front of the subject vehicle M decelerates, the locus generating unit 146 generates a locus for decelerating the subject vehicle M. The HMI control unit 170 acquires positions and sections at which the subject vehicle M decelerates on the basis of the locus information generated by the locus generating unit 146 and displays deceleration information 320 including information relating to the positions and the sections that have been acquired on the screen 300.

In addition, by displaying the deceleration information 320 in association with the display of the locus information 310, the acceleration/deceleration display control unit 174 can allow a vehicle occupant to easily acquire positions on the locus of the subject vehicle M at which acceleration or deceleration is started, and the acceleration or the deceleration ends. In addition, the interface control unit 178 may display information representing acceleration or deceleration a certain degree ahead using text information 330 and/or speech. Each information output as the deceleration information 320 and the text information 330, which are displayed on the screen, and the speech is information corresponding to the acceleration/deceleration information.

Figure 15:
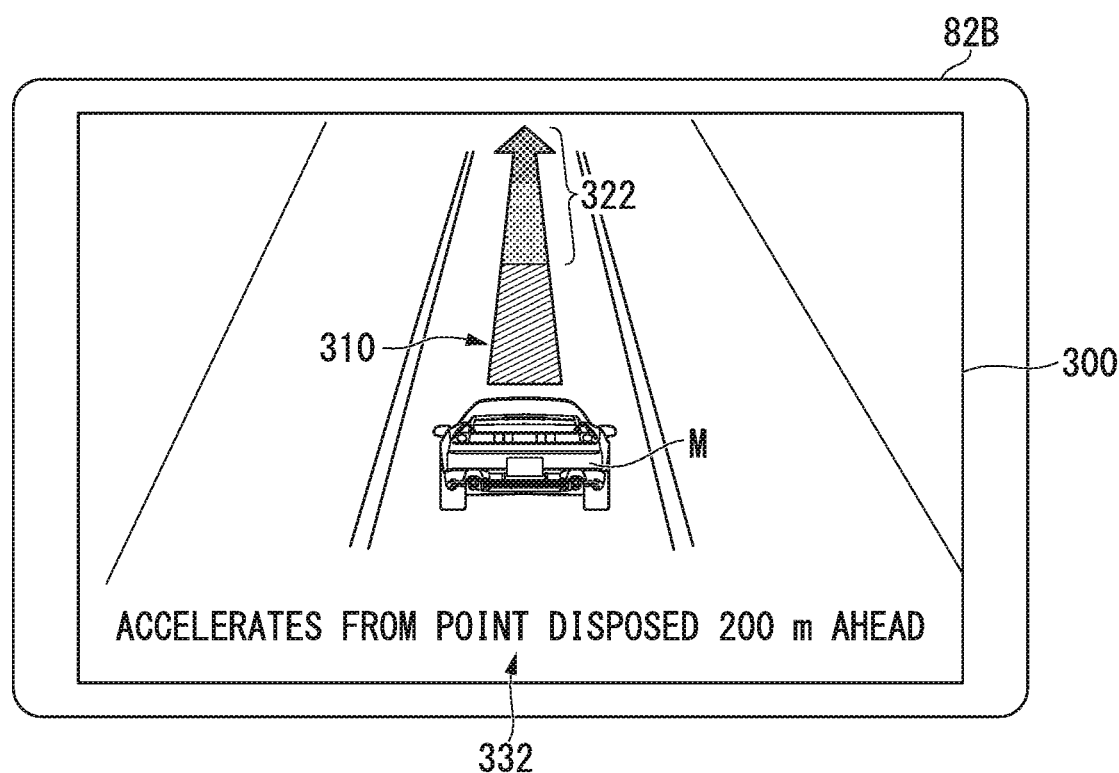
FIG. 15 is a diagram illustrating an example in which acceleration information of a subject vehicle M is displayed on the screen.

FIG. 15 is a diagram illustrating an example in which acceleration information of a subject vehicle M is displayed on the screen. In the example illustrated in FIG. 15, the locus information 310 of the subject vehicle M is displayed on the display device 82B. In the example illustrated in FIG. 15, since there is no surrounding vehicles in front of the subject vehicle M, the acceleration information 322 generated by the acceleration/deceleration display control unit 174 on the basis of the locus information is displayed on the locus information 310. In addition, text information 332 corresponding to the acceleration information 322 is displayed.

Although the information displayed as the text information 330 and 332 described above is a start point (distance information) of acceleration/deceleration and an action (acceleration or deceleration) of the subject vehicle M in the examples illustrated in FIGS. 14 and 15, the information is not limited thereto. For example, the acceleration/deceleration display control unit 174 may calculate a time until the subject vehicle M reaches a start point at which the subject vehicle M accelerates or decelerates on the basis of the vehicle speed of the subject vehicle M and display the calculated time as text information or the like. In such a case, for example, "deceleration is performed after 10 seconds" or the like is displayed as the text information. Accordingly, a vehicle occupant can prepare for withstanding a load relating to the vehicle occupant according to the acceleration/deceleration of the subject vehicle M.

In addition, in this embodiment, as illustrated in FIGS. 14 and 15, the speed may be displayed in a different display form for each planned speed, and the speed may be displayed using a number. Furthermore, the acceleration/deceleration display control unit 174, for example, may display an inter-vehicle distance to the vehicle running ahead mA or the like. In addition, in this embodiment, the subject vehicle M may not be displayed on the screen 300, or only a part (front part) of the subject vehicle M may be displayed.

Figure 16:
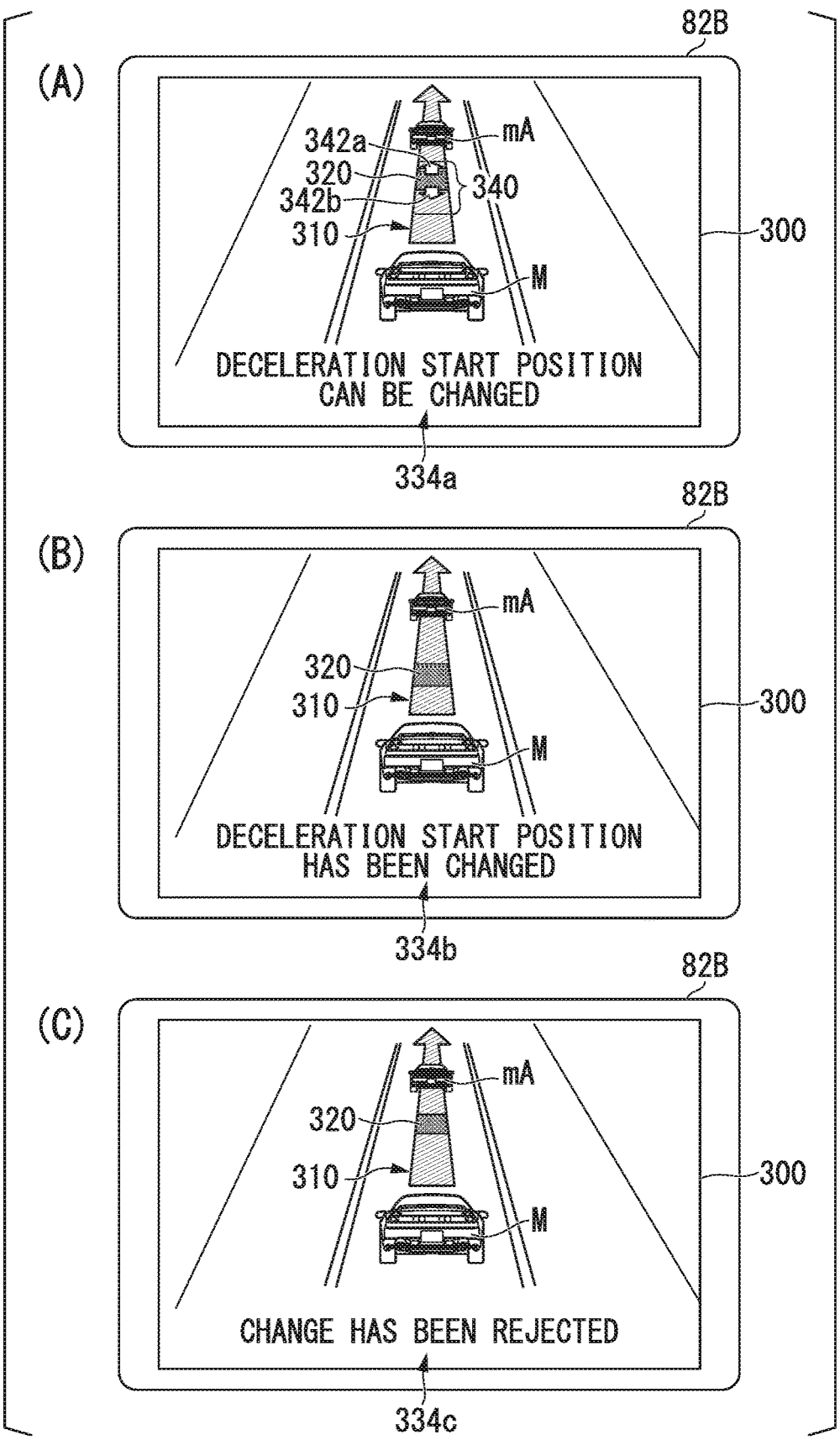
FIG. 16 is a diagram illustrating control of changing an acceleration/deceleration position.

FIG. 16 is a diagram illustrating control of changing an acceleration/deceleration position. In the example illustrated FIG. 16, while one example of display control of a case in which a deceleration start position (may include a deceleration end point) is changed is illustrated, a process for changing an acceleration start position is similarly performed. The acceleration/deceleration display control unit 174 generates an image displaying deceleration information 320 relating to a deceleration position and a deceleration section and displays an indication representing that a deceleration start position can be changed.

The acceleration/deceleration display control unit 174, as illustrated in FIG. 16(A), displays objects (for example, arrows 342a and 342b) representing a direction to be changed for the deceleration information 320. In addition, the acceleration/deceleration display control unit 174 displays message information 334a representing that the deceleration start position can be changed on the screen 300.

For example, the vehicle occupant performs an operation of touching an area of the deceleration information 320 on the screen 300 of the display device 82B using fingers or the like and moving the fingers to the arrow 342a or the arrow 342b that is displayed (for example, a swiping operation), thereby performing a corresponding change direction. In addition, the vehicle occupant can change a deceleration start position using operation details for the driving operation system of the HMI 70 (for example, the acceleration pedal 71, the brake pedal 74, or the steering wheel 78).

Figure 17:
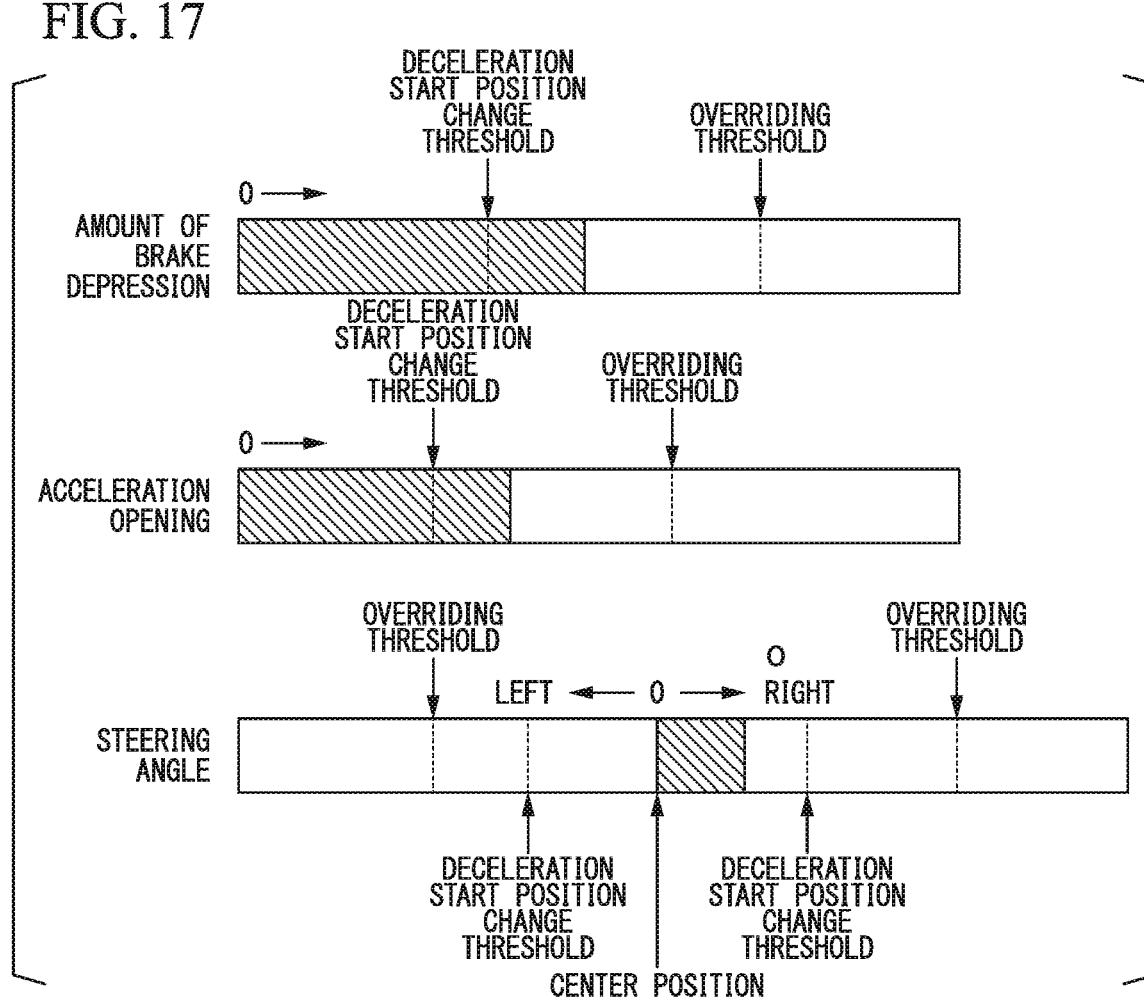
FIG. 17 is a diagram illustrating an example of a change of a deceleration start position using a driving operation system.

FIG. 17 is a diagram illustrating an example of changing of a deceleration start position using a driving operation system. In the example illustrated in FIG. 17, an example in which changing of a deceleration start position is accepted in accordance with an operation for the driving operation system of the HMI 70 is illustrated. In this embodiment, for example, in accordance with the amount of brake depression according to the brake pedal 74, acceleration opening according to the acceleration pedal 71, and an operation amount of the steering angle according to the steering wheel 78, the deceleration start position can be changed.

For example, in a case in which an image as illustrated in FIG. 16(A) representing that a deceleration start position can be changed is displayed, by operating the driving operation system (at least one of the brake pedal 74, the acceleration pedal 71, and the steering wheel 78), the deceleration start position can be changed. In the example illustrated in FIG. 17, a state not operated by a vehicle occupant (excluding the amount of operation that is automatically operated in accordance with automated driving control) is set as "0", and the amount of operation according to a vehicle occupant's operation therefrom is denoted by diagonal lines.

Here, in each of the amount of brake depression according to the brake pedal 74, the acceleration opening according to the acceleration pedal 71, and the amount of operation of the steering angle according to the steering wheel 78, an overriding threshold is set, and, when an operation of the threshold or more is performed, overriding control using the switching control unit 150 is performed. Accordingly, in this embodiment, as illustrated in FIG. 17, a deceleration start position change threshold is set before reaching the overriding threshold, and, in a case in which at least one of the amount of brake depression, the acceleration opening, and the operation amount of the steering angle is equal to or greater than the deceleration start position change threshold and is less than the overriding threshold, it is accepted as a deceleration start position change direction. In addition, in this embodiment, during the change of the deceleration start position, a reaction force may be given at the overriding threshold, or a warning may be output from an interface device (the HMI 70 or the like) such that the amount of operation performed by a vehicle occupant does not erroneously exceed the overriding threshold.

In the example illustrated in FIG. 17, an operation for the amount of brake depression or the acceleration opening is accepted as a direction for changing the deceleration start position. The amount of change, for example, may be set in accordance with the amount of operation when the deceleration start position change threshold is set as a reference. In addition, for example, the amount of change may be adjusted in accordance with a time (continuation time) in which the amount of operation is equal to or greater than the deceleration start position change threshold and is less than the overriding threshold.

In addition, regarding whether the deceleration start position further approaches the subject vehicle M from the current set position or becomes further away from the subject vehicle M than the current set position (whether the start of the deceleration is advanced or delayed), for example, the deceleration start position is changed to a position further approaching the subject vehicle M side in a case in which the steering wheel 78 is turned to the right from a neutral position, and the deceleration start position is changed to a position further away from the subject vehicle M in a case in which the steering wheel is turned to the left from a neutral position. In addition, the deceleration start position is changed to a position further approaching the subject vehicle M side in a case in which the brake pedal 74 is operated, and the deceleration start position is changed to a position further away from the subject vehicle M in a case in which the acceleration pedal 71 is operated. In addition, when an operation of which the amount is less than a threshold (for example, the overriding threshold) at which the automated driving control according to the running control unit 160 is released is accepted from the acceleration pedal 71 or the brake pedal 74, the acceleration/deceleration position or the acceleration/deceleration section may be changed to be advanced.

In addition, by outputting the image as illustrated in FIG. 17 to the display device 82, a vehicle occupant is allowed to acquire that the vehicle occupant can change the action plan, and erroneous overriding control can be prevented. Furthermore, in addition to the HMI 70 described above, for example, the deceleration start position may be changed using the steering switch 87B.

The acceleration/deceleration change accepting unit 176 accepts the operation details of the vehicle occupant described above and outputs information based on the operation details to the automated driving control unit 120. The automated driving control unit 120 determines whether or not the change of the deceleration start position is included in the allowed range of change using the locus generating unit 146. In the case of a change within the allowed range of change, the locus generating unit 146 performs rescheduling of the running locus corresponding to the details of the direction, outputs information of the rescheduling to the running control unit 160, and outputs an indication thereof to the HMI control unit 170. On the other hand, in the case of a change which is not included in the allowed range of change, the locus generating unit 146 rejects the change direction from the vehicle occupant and outputs information representing rejection thereof to the HMI control unit 170.

In a case in which the deceleration start position has been changed, the acceleration/deceleration display control unit 174, as illustrated in FIG. 16(B), corrects and displays the deceleration information 320 at the changed position and displays message information 334b representing that the deceleration start position has been changed on the screen. On the other hand, in a case in which the deceleration start position has not been changed, the acceleration/deceleration display control unit 174, as illustrated in FIG. 16(C), displays the deceleration information 320 in a state before change on the screen 300 of the display device 82B and displays message information 334c representing rejection of the change. As described above, by displaying information relating to the deceleration start position or the deceleration start section at the time of automated driving, the vehicle occupant can acquire the acceleration/deceleration position in advance. In addition, by changing the acceleration/deceleration start position, the vehicle occupant can adjust a time before acceleration or deceleration is performed and can prepare for the acceleration/deceleration of the subject vehicle M in advance more assuredly.

Figure 18:
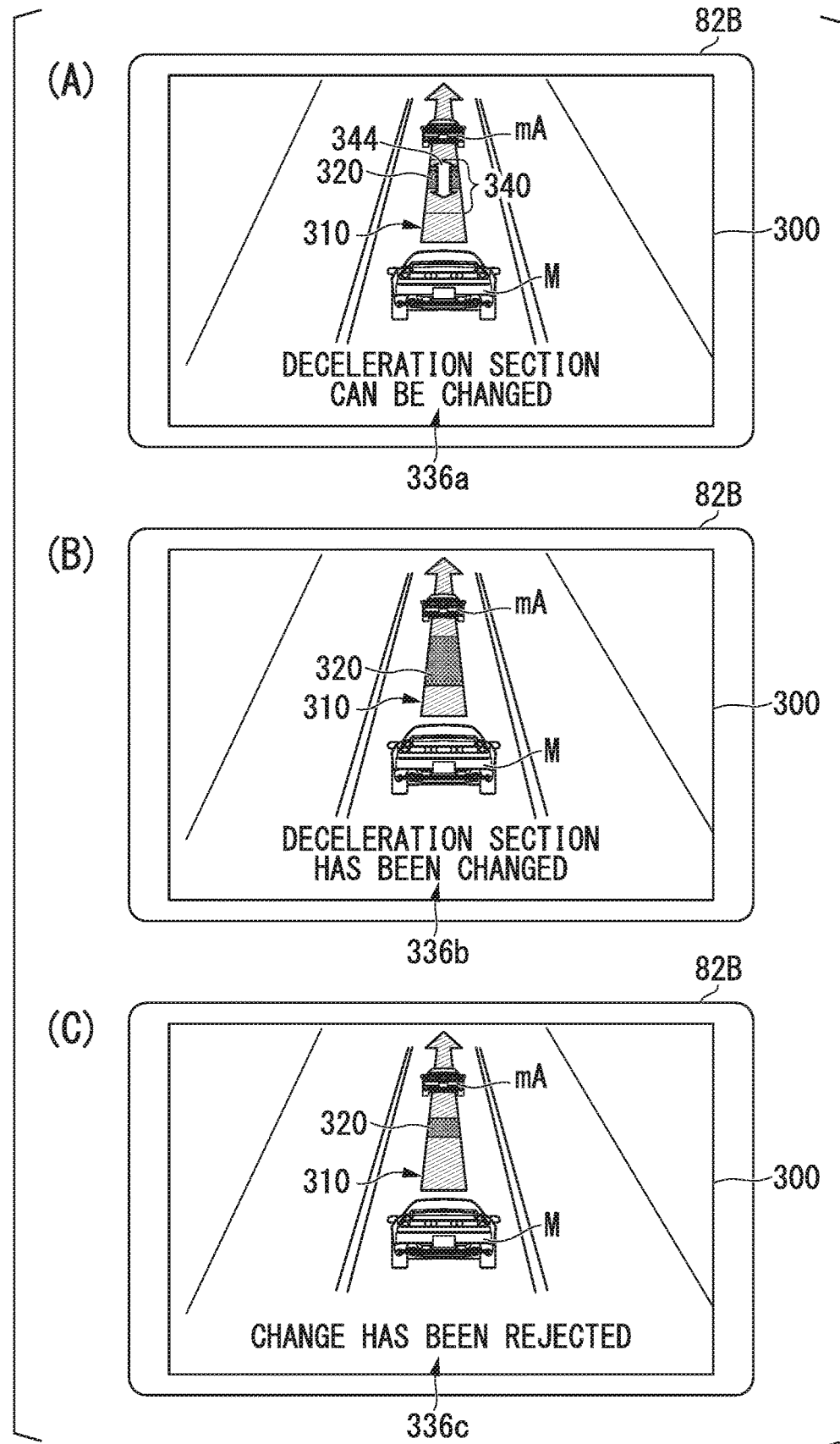
FIG. 18 is a diagram illustrating control of changing a section in which acceleration/deceleration is performed.

FIG. 18 is a diagram illustrating control of changing a section in which acceleration/deceleration is performed. In description presented with reference to FIG. 18, although one example of display control of a case in which a deceleration section is changed is illustrated, a process for changing an acceleration section is similarly performed. The acceleration/deceleration display control unit 174 generates an image displaying the deceleration information 320 relating to a deceleration position and a deceleration section and displays an indication representing that the deceleration section can be changed.

The acceleration/deceleration display control unit 174, as illustrated in FIG. 18(A), displays an object (for example, an arrow 344) representing a direction for changing the deceleration information 320. In addition, the acceleration/deceleration display control unit 174 displays message information 336a representing an indication representing that the deceleration section can be changed on the screen 300.

For example, the vehicle occupant performs an operation (for example, a pinch-out operation or a pinch-in operation) of touching an area of the deceleration information 320 on the screen 300 of the display device 82B using fingers or the like and moving the fingers in the direction of the displayed arrow 344 or a direction opposite thereto, thereby a corresponding change direction can be made.

In addition, the vehicle occupant can change the deceleration section using operation details for the driving operation system (for example, the acceleration pedal 71, the brake pedal 74, or the steering wheel 78) of the HMI 70 described above. In such a case, for example, a deceleration section change threshold is set instead of the deceleration start position change threshold as illustrated in FIG. 17, and, in a case in which there is an operation of which the amount is equal to or greater than the set deceleration section change threshold and less than the overriding threshold, a change direction from the vehicle occupant is accepted. Here, changing of the deceleration section is changing of a section in which the subject vehicle M is controlled to decelerate to a predetermined speed. In a case in which the deceleration section is changed to be wide, deceleration control that is gentler than the deceleration control at the current time point generated by the locus generating unit 146 is performed, and, in a case in which the deceleration section is changed to be narrow, deceleration control that is sharper than the deceleration control at the current time point generated by the locus generating unit 146 is performed.

The acceleration/deceleration change accepting unit 176 accepts details of the vehicle occupant's operation described above and outputs information based on the details of the operation to the automated driving control unit 120. The automated driving control unit 120 determines whether or not the changing of the deceleration section is included in the allowed range of change using the locus generating unit 146. In a case in which the changing is included in the allowed range of change, the locus generating unit 146 performs rescheduling of the locus corresponding to the details of the direction, outputs the rescheduled locus to the running control unit 160, and outputs an indication thereof to the HMI control unit 170. On the other hand, in a case in which the changing is not included in the allowed range of change, the change direction from the vehicle occupant is rejected, and information representing an indication thereof is output to the HMI control unit 170.

In a case in which the deceleration section position has been changed, the acceleration/deceleration display control unit 174, as illustrated in FIG. 18(B), corrects and displays the deceleration information 320 at the changed position and displays message information 336b representing that the deceleration section has been changed on the screen. On the other hand, in a case in which the deceleration section has not been changed, the acceleration/deceleration display control unit 174, as illustrated in FIG. 18(C), displays the deceleration information 320 in a state before change on the screen 300 of the display device 82B and displays message information 336c representing rejection of the change.

As described above, by displaying information relating to the deceleration start position or the deceleration section at the time of automated driving, the vehicle occupant can acquire the acceleration/deceleration section in advance. In addition, by changing the acceleration/deceleration section, the vehicle occupant can adjust a time in which the acceleration/deceleration is performed and/or the amount of the acceleration/deceleration and can prepare for the acceleration/deceleration of the subject vehicle M in advance more assuredly.

In addition, regarding which one of the acceleration/deceleration position and the acceleration/deceleration section described above will be changed, for example, a target to be changed may be switched in accordance with a switching operation using the steering switch 87B, and switching between the screen illustrated in FIG. 16(A) and the screen illustrated in FIG. 18(A) may be performed at predetermined time intervals.

In addition, in this embodiment, the acceleration/deceleration display control unit 174, after accepting an operation for changing the position or the section, in which the subject vehicle accelerates or decelerates in the speed control, that is made by a vehicle occupant of the subject vehicle M, may display information representing a position or a section at which the subject vehicle M accelerates or decelerates in the speed control after the change of the schedule on the screen 300 of the display device 82B in association with information representing the running locus before changing the schedule.

In such a case, after displaying the information at the timing described above, the interface control unit 178 may display message information such as "Will this change be OK?" and selection information such as "Yes/No button" on the screen 300 of the display device 82B. In a case in which information of "Yes" is received in accordance with vehicle occupant's selection of the button, the interface control unit 178 changes the schedule. On the other hand, in a case in which information of "No" is received, the interface control unit 178 does not change the schedule. In this way, the vehicle occupant can acquire information after the change before the schedule is changed. In addition, the vehicle occupant can perform a desired schedule change.

In the display example described above, although an example in which the information is displayed on the display device 82B has been illustrated, for example, similar display may be performed on a display unit of the navigation device 50, the content reproducing device 85, or the like. In addition, in a case in which the information is displayed in the display device 82A of the HUD or the like, instead of displaying the image captured from the camera 40, by projecting an image (object) relating to the locus information and the acceleration/deceleration information onto an optical glass element arranged in the front glass or the like, information such as the locus information, the acceleration information, and the like is displayed directed into the visual field of the vehicle occupant.

<Process Flow>

Hereinafter, the flow of the process performed by the vehicle control system 100 according to this embodiment will be described. In the following description, among various processes performed in the vehicle control system 100, a display control process using mainly the HMI control unit 170 for the display unit will be described. In addition, in the following description, an example of display control for the display device 82B and the like will be described.

Figure 19:
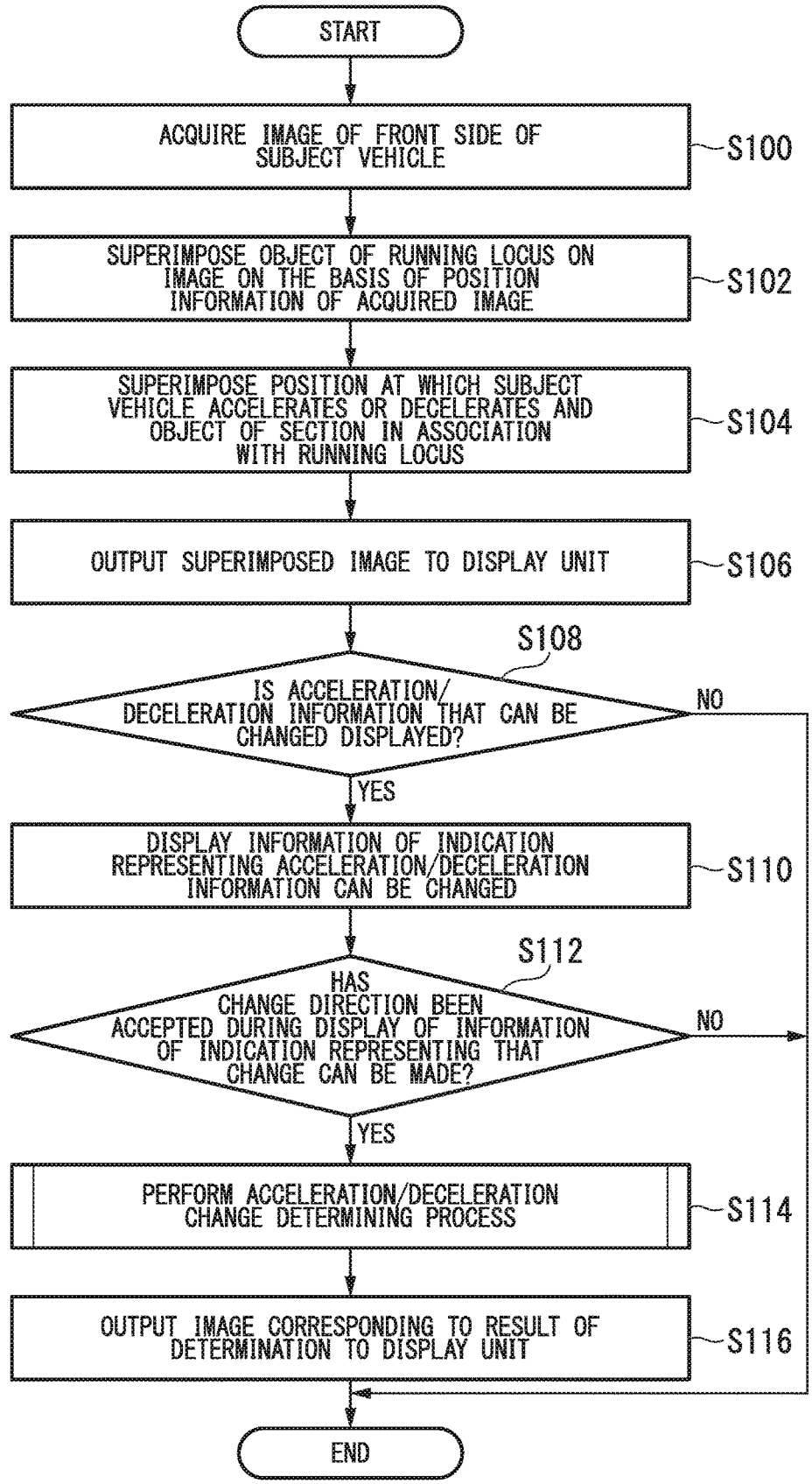
FIG. 19 is a flowchart illustrating one example of a display control process.

FIG. 19 is a flowchart illustrating one example of the display control process. In the example illustrated in FIG. 19, the HMI control unit 170 acquires an image on the front side of the subject vehicle M captured by the camera 40 mounted in the subject vehicle M (Step S100). Next, the locus display control unit 172 superimposes an object of a running locus (locus information) generated (scheduled) by the locus generating unit 146 on the acquired image on the basis of position information of the acquired image (Step S102). In addition, in the process of Step S102, the object may be integrated instead of being superimposed. In the following description, a case in which the object is superimposed will be described as an example.

Next, the acceleration/deceleration display control unit 174 superimposes the object of positions and sections at which the subject vehicle M accelerates or decelerates on the image in association with the running locus (Step S104). In addition, in the process of Step S104, the acceleration/deceleration position or the acceleration/deceleration section may be superimposed. Next, the interface control unit 178 outputs an image acquired by superimposing the running locus and the acceleration/deceleration information (a position and a section at which the subject vehicle accelerates or decelerates) to the display unit (Step S106).

Next, the interface control unit 178 determines whether or not acceleration/deceleration information that can be changed is displayed (Step S108). In a case in which acceleration/deceleration information that can be changed is displayed, the acceleration/deceleration display control unit 174 outputs information representing that the acceleration/deceleration information can be changed to the display unit (Step S110).

Next, the acceleration/deceleration change accepting unit 176 determines whether or not a predetermined change direction has been accepted from a vehicle occupant while information of an indication representing that the change can be made is displayed on the display unit (Step S112). Here, for example, the predetermined change direction, as described above, may be a change direction using the driving operation system of the HMI 70 or a change direction using the non-driving operation system.

In a case in which the change direction is accepted, the acceleration/deceleration display control unit 174 performs an acceleration/deceleration change determining process (Step S114). A specific example of the acceleration/deceleration change determining process will be described later. Next, the interface control unit 178 outputs an image corresponding to a result of the determination to the display unit (Step S116).

On the other hand, in a case in which acceleration/deceleration information that can be changed is not displayed or in a case in which a change direction has not been accepted during the display of the indication representing that a change can be made, the HMI control unit 170 ends this flowchart. The process illustrated in FIG. 19 is repeatedly executed at predetermined intervals or in accordance with occurrence of a predetermined event while the HMI control is performed.

Figure 20:
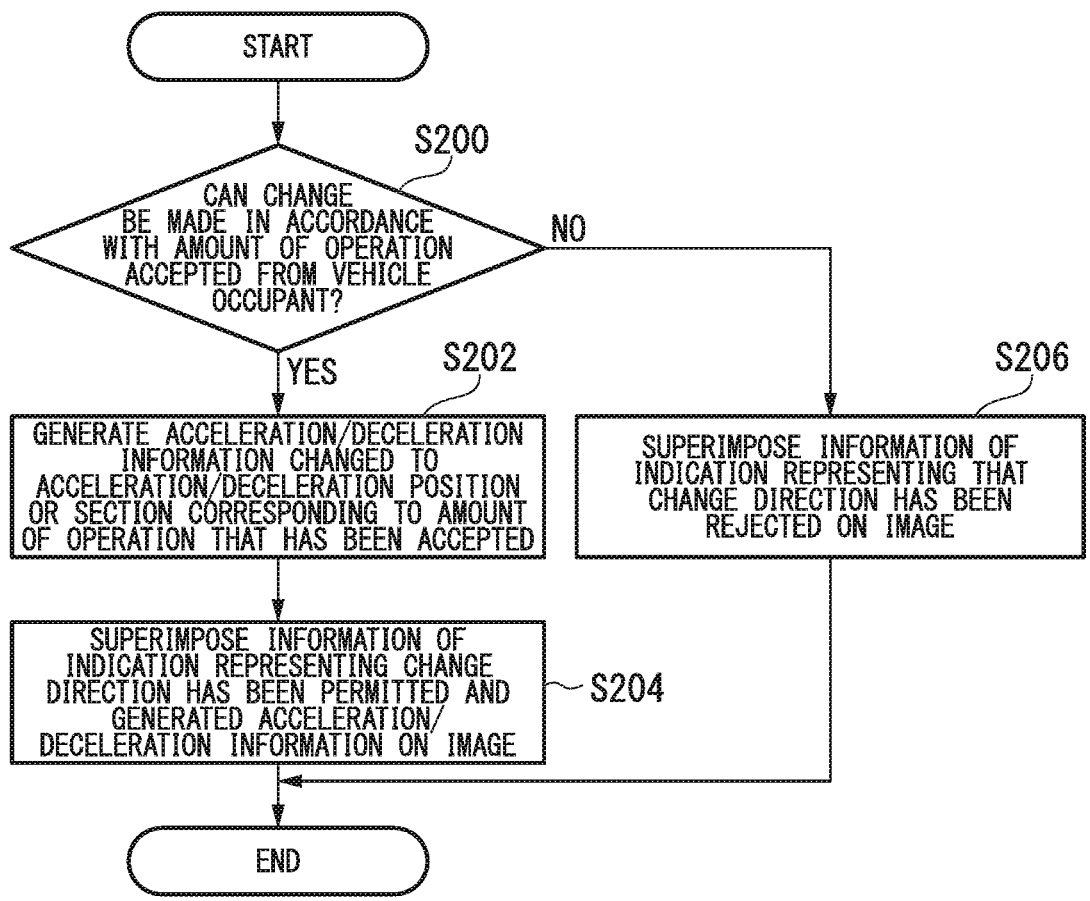
FIG. 20 is a flowchart illustrating one example of an acceleration/deceleration change determining process.

FIG. 20 is a flowchart illustrating one example of the acceleration/deceleration change determining process. In the example illustrated in FIG. 20, the acceleration/deceleration change accepting unit 176 determines whether or not a change according the amount of operation accepted from the vehicle occupant can be made (Step S200). In this case, the acceleration/deceleration change accepting unit 176, for example, may determine whether or not the amount of operation corresponding to a vehicle occupant's change direction is an amount changing the locus information by a predetermined value or more and, in a case in which the amount of operation is not the amount changing the locus information by the predetermined value or more, may determine that the change can be made (within the allowed range of change). In addition, the determination described above is performed by the automated driving control unit 120, and a result thereof is output to the HMI control unit 170.

In a case in which a change according to the amount of operation accepted from the vehicle occupant can be made, the acceleration/deceleration display control unit 174 generates acceleration/deceleration information changed to an acceleration/deceleration position or an acceleration/deceleration section corresponding to the accepted amount of operation is generated on the basis of the locus information rescheduled by the automated driving control unit 120 (Step S202). In addition, the acceleration/deceleration display control unit 174 superimposes information of an indication representing that the change direction is permitted as a result of the determination and the generated acceleration/deceleration information on the image (Step S204). On the other hand, in a case in which a change according to the amount of operation accepted from the vehicle occupant cannot be made, the acceleration/deceleration display control unit 174 superimposes information of an indication representing that the change direction has been rejected on the image (Step S206).

In addition, in this embodiment, in a case in which a change according to the amount of operation accepted from the vehicle occupant cannot be made, the acceleration/deceleration position or the acceleration/deceleration section may be changed with a maximal amount that can be changed allowed instead of rejecting the change direction.

According to the embodiment described above, by displaying the acceleration/deceleration information on the running locus displayed on the display unit or the like, the vehicle occupant can be allowed to intuitively know details of the control according to the automated driving of the subject vehicle M.

As above, while the embodiment of the present invention has been described using the embodiments, the present invention is not limited to such embodiments at all, and various modifications and substitutions may be made in a range not departing from the concept of the present invention.

INDUSTRIAL APPLICABILITY

The present invention can be used in the vehicle manufacturing industry.

REFERENCE SIGNS LIST

20 Finder
30 Radar
40 Camera
DD Detection device
50 Navigation device
60 Vehicle sensor
70 HMI
100 Vehicle control system
110 Target lane determining unit
120 Automated driving control unit
130 Automated driving mode control unit
140 Subject vehicle position recognizing unit
142 External system recognizing unit
144 Action plan generating unit
146 Locus generating unit
146A running mode determining unit
146B locus candidate generating unit
146C evaluation/selection unit
150 Switching control unit
160 Running control unit
170 HMI control unit
172 Locus display control unit
174 Acceleration/deceleration display control unit
176 Acceleration/deceleration change accepting unit
178 Interface control unit
180 Storage unit
200 Running driving force output device
210 Steering device
220 Brake device
M Subject vehicle

What is claim is:

1. A vehicle control system comprising:
a processor; and
a memory that stores instructions that, when executed by the processor, facilitates performance of operations, comprising:
determining a schedule of a running locus and speed control of a subject vehicle;
performing automated driving including at least speed control of the subject vehicle based on the schedule;
causing a display device to display information representing a position or a section at which the subject vehicle accelerates or decelerates in the speed control in association with information representing a running locus based on the schedule in a case in which there is an amount of change in a current vehicle speed or a planned vehicle speed that is equal to or greater than a first threshold,
accepting an operation of a driving operation system for changing the position or the section at which the subject vehicle accelerates or decelerates in the speed control that is made by an occupant of the subject vehicle,
for an operation amount input by the occupant, setting a second threshold when the automated driving is released and changed to a manual driving and a third threshold that is smaller than the second threshold at which the position or section is changed where the automated driving is performed,
changing the schedule performing the speed control of the automated driving based on the operation based on the operation amount of the operation control system input by the occupant, when the operation of the operation control system that changes at least one of a start position, an end position, or section of acceleration of deceleration in the speed control of the automated driving when the operation amount is equal to or greater than the third threshold and equal to or less than the second threshold.

2. The vehicle control system according to claim 1, wherein the operations further comprise causing the display device to display the position or the section at which the subject vehicle accelerates or decelerates in the speed control in a display form different from that of a background.

3. The vehicle control system according to claim 1, wherein the operations further comprise causing the display device to display an image acquired by superimposing or integrating speed control information representing the position or the section at which the subject vehicle accelerates or decelerates in the speed control on or with an object corresponding to a running locus of the subject vehicle.

4. The vehicle control system according to claim 1,
wherein the display device is a head-up display, and
wherein the operations further comprise projecting information representing one or both of the position or the section at which the subject vehicle accelerates or decelerates in the speed control and the running locus in association with an actual space visible through a front windshield that is a projection destination of the head-up display.

5. The vehicle control system according to claim 1, wherein the operations further comprise causing the display device to output information representing that the position or the section at which the subject vehicle accelerates or decelerates in the speed control, which is output to the display unit, is changeable.

6. The vehicle control system according to claim 1, wherein the operations further comprise causing the display device to display information representing the position or the section at which the subject vehicle accelerates or decelerates in the speed control after the change of the schedule in association with information representing the running locus before the schedule is changed based on the operation.

7. The vehicle control system according to claim 1,
wherein the operations further comprise accepting the operation of the driving operation system in accordance with an operation of an acceleration pedal or a brake pedal of the subject vehicle with an amount of operation that is less than the second threshold, and
wherein the operations further comprise changing the schedule such that the position or the section at which the subject vehicle accelerates or decelerates in the speed control advances based on the operation amount input by the occupant.

8. The vehicle control system according to claim 1, wherein the operations further comprise causing the display device to display information regarding the operation amount input by the occupant, the second threshold, and the third threshold.

9. The vehicle control system according to claim 1, wherein the operations further comprise supplying a reaction force to the operation input by the occupant so that the operation amount is not equal to or greater than the second threshold in a case that at least one of the start position, the end position, or the section of acceleration or deceleration in the speed control is changing.

10. The vehicle control system according to claim 1, wherein the amount of change in at least one of the start position, the end position, or the section of acceleration or deceleration in the speed control is set depending on the operation amount based on the second threshold.

11. A vehicle control method using an in-vehicle computer, the vehicle control method comprising:
   determining a schedule of a running locus and speed control of a subject vehicle;
   performing an automated driving including at least speed control of the subject vehicle on the basis of the determined schedule;
   causing a display unit to display information representing a position or a section at which the subject vehicle accelerates or decelerates in the speed control in association with information representing the running locus on the basis of the determined schedule in a case in which there is an amount of change in a current vehicle speed or a planned vehicle speed that is equal to or greater than a first threshold, accepting an operation of a driving operation system for changing the position or the section at which the subject vehicle accelerates or decelerates in the speed control that is made by an occupant of the subject vehicle,
   for an operation amount input by the occupant, setting a second threshold when the automated driving is released and changed to a manual driving and a third threshold that is smaller than the second threshold at which the position or section is changed when the automated driving is performed,
   changing the schedule performing the speed control of the automated driving based on the operation based on the operation amount of the operation control system input by the occupant, when the operation of the operation control system that changes at least one of a start position, an end position, or section of acceleration of deceleration in the speed control of the automated driving when the operation amount is equal to or greater than the third threshold and equal to or less than the second threshold.

12. A non-transitory computer-readable storage medium storing program instructions that causes an in-vehicle computer to facilitate performance of operations, comprising:
   determining a schedule of a running locus and speed control of a subject vehicle;
   performing an automated driving including at least speed control of the subject vehicle on the basis of the determined schedule;
   causing a display unit to display information representing a position or a section at which the subject vehicle accelerates or decelerates in the speed control in association with information representing the running locus on the basis of the determined schedule in a case in which there is an amount of change in a current vehicle speed or a planned vehicle speed that is equal to or greater than a first threshold,
   accepting an operation of a driving operation system for changing the position or the section at which the subject vehicle accelerates or decelerates in the speed control that is made by an occupant of the subject vehicle,
   for an operation amount input by the occupant, setting a second threshold when the automated driving is released and changed to a manual driving and a third threshold that is smaller than the second threshold at which the position or section is changed where the automated driving is performed,
   changing the schedule performing the speed control of the automated driving based on the operation based on the operation amount of the operation control system input by the occupant, when the operation of the operation control system that changes at least one of a start position, an end position, or section of acceleration of deceleration in the speed control of the automated driving when the operation amount is equal to or greater than the third threshold and equal to or less than the second threshold.

* * * * *